United States Patent [19]

Greene

[11] Patent Number: 4,464,559

[45] Date of Patent: Aug. 7, 1984

[54] PHASE-CONVERTING, VARIABLE OUTPUT, POWER SOURCE UTILIZING SCOTT CONNECTION

[75] Inventor: William J. Greene, Walterboro, S.C.

[73] Assignee: Teledyne-Walterboro, a Divison of Teledyne Industries, Inc., Calif.

[21] Appl. No.: 374,617

[22] Filed: May 3, 1982

[51] Int. Cl.³ .............................................. B23K 9/10
[52] U.S. Cl. .................................. 219/130.51; 363/12
[58] Field of Search ........... 219/130.1, 130.31, 130.32, 219/130.33, 130.51; 363/12

[56] References Cited

U.S. PATENT DOCUMENTS

| | | | |
|---|---|---|---|
| 2,644,109 | 6/1953 | Mulder | 219/130.33 |
| 3,199,016 | 8/1965 | Greene et al. | 219/130.32 |
| 3,287,625 | 11/1966 | Malatier et al. | 219/130.1 |
| 3,317,811 | 5/1967 | Normando et al. | 219/130.22 |
| 3,564,333 | 2/1971 | Cramer et al. | 219/130.32 |
| 4,049,946 | 9/1977 | Fluckiger et al. | 219/130.32 |

Primary Examiner—C. C. Shaw
Attorney, Agent, or Firm—Rogers, Eilers & Howell

[57] ABSTRACT

An electric welder has magnetic cores with windings thereon which perform the functions of transformer windings as well as the functions of magnetic amplifier windings. The secondary windings, on each pair of those magnetic cores, are connected in series relation; and, similarly, the control windings on that pair of magnetic cores are connected in series relation. One of those control windings can have the voltage across it reduced to essentially-zero to cause a high voltage to be developed across the control winding on the other of that pair of magnetic cores—with consequent prompt saturation of that other magnetic core and with the development of an output pulse by the secondary windings on that pair of magnetic cores.

20 Claims, 9 Drawing Figures

PHASE-CONVERTING, VARIABLE OUTPUT, POWER SOURCE UTILIZING SCOTT CONNECTION

BACKGROUND OF THE INVENTION

Electric welders should be able to control the levels of the welding currents which they supply and, desirably, those electric welders should be able to change the volt-ampere output curves thereof. In addition, those electric welders should be capable of being made sturdy and rugged while being relatively inexpensive.

Prior Art

Some electric welders rely upon transformers to provide high values of current, and rely upon control circuits for those transformers to provide the desired levels of welding current and to provide desired volt-ampere output curves. Other electric welders rely upon transformers to provide high values of current, and rely upon magnetic amplifiers and control circuits therefor to provide the desired levels of welding current and to provide desired volt-ampere output curves. Still other electric welders rely upon transformers to provide high values of current, and rely upon selectively-conductive elements, such as thyratrons, SCRs and transistors, to provide the desired levels of welding current and to provide desired volt-ampere output curves.

SUMMARY OF THE INVENTION

The electric welder provided by the present invention has magnetic cores with windings thereon which perform the functions of transformer windings as well as the functions of magnetic amplifier windings. As a result, that electric welder requires less iron in the cores thereof and less copper in the windings thereof than does an electric welder which requires transformers plus magnetic amplifiers. Also, the electric welder provided by the present invention is more compact and less expensive to construct than an electric welder which requires transformers plus magnetic amplifiers. It is, therefore, an object of the present invention to provide an electric welder that has magnetic cores with windings thereon which perform the functions of transformer windings as well as the functions of magnetic amplifier windings.

The secondary windings, on each pair of the magnetic cores, of the electric welder provided by the present invention are connected in series relation, and, similarly, the control windings on that pair of magnetic cores are connected in series relation. One of those control windings can have the voltage across it reduced to essentially-zero to cause a high voltage to be developed across the control winding on the other of that pair of magnetic cores. The consequent prompt saturation of that other magnetic core will lead to the development of an output pulse by the secondary windings on that pair of magnetic cores. As a result, it is merely necessary to reduce the voltage across one of the control windings of a pair of magnetic amplifiers to cause the secondary windings of those magnetic amplifiers to develop an output pulse. It is, therefore, an object of the present invention to connect the secondary windings, of each pair of magnetic amplifiers of an electric welder, in series relation and to connect the control windings, of that pair of magnetic amplifiers, in series relation so it is merely necessary to reduce the voltage across one of those control windings to cause the secondary windings of those magnetic amplifiers to develop an output pulse.

The electric welder provided by the present invention can reduce the voltage across one of the control windings, of a pair of the magnetic amplifiers thereof, at different points in the half-cycles applied to that control winding. The subsequent saturation of the control winding on the other magnetic amplifier, at corresponding different points in those half-cycles, will cause the voltage across the one control winding to increase sharply at further corresponding different points in those half-cycles—with consequent variations in the durations and amplitudes of the output pulses from the secondary windings of those magnetic amplifiers. It is, therefore, an object of the present invention to provide an electric welder wherein the voltages across the control windings on the cores of the magnetic amplifiers can be reduced to essentially-zero at different points in the half-cycles developed across those control windings to enable secondary windings of those magnetic amplifiers to provide output pulses of different durations and amplitudes.

The cores of the magnetic amplifiers of the electric welder provided by the present invention respond to current in the primary windings thereof to produce voltages across the control windings thereof. By selectively shunting those control windings, and thereafter causing those control windings to develop pulses, the present invention enables the secondary windings of those magnetic amplifiers to develop output pulses. It is, therefore, an object of the present invention to provide an electric welder that has magnetic amplifiers with control windings which can be selectively shunted, and which can thereafter be caused to develop pulses to enable the secondary windings of those magnetic amplifiers to provide output pulses.

Selectively-conductive elements are connected across the control windings, of the magnetic amplifiers of the electric welder of the present invention, and those selectively-conductive elements can be rendered conductive at different times. Those selectively-conductive elements can be rendered conductive at, or following, the beginnings of half-cycles of the A.C. which is supplied to those control windings; and those selectively-conductive elements will be rendered non-conductive before the ends of those half-cycles to establish pulses. The secondary windings on those magnetic amplifiers respond to those pulses to develop output pulses of variable duration and amplitude. It is, therefore, an object of the present invention to connect a selectively-conductive element across the control windings of a pair of magnetic amplifiers, to render that selectively-conductive element conductive at different points in the half-cycles applied to those control windings, to render that selectively-conductive element non-conductive before the ends of those half-cycles and thereby enable those control windings to develop pulses, and to cause the secondary windings of those magnetic amplifiers to respond to those pulses to develop output pulses.

Other and further objects and advantages of the present invention should become apparent from an examination of the drawing and accompanying description. In the drawing and accompanying description, two preferred embodiments of the present invention are shown and described but it is to be understood that the drawing and accompanying description are for the purpose of illustration only and do not limit the invention and that the invention will be defined by the appended claims.

DESCRIPTION OF THE PREFERRED EMBODIMENTS

Components of the First Preferred Embodiment

Figures 1, 6:
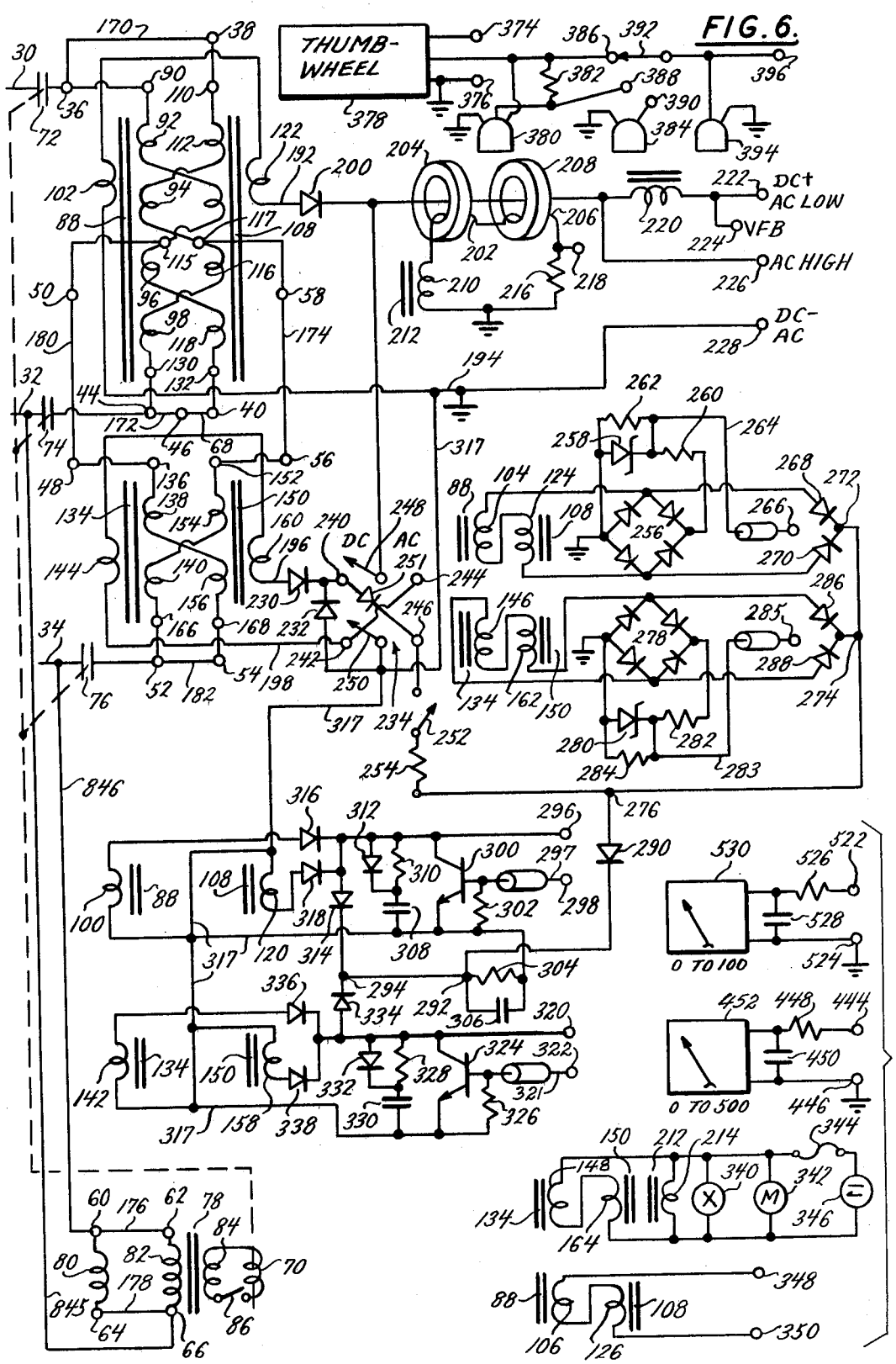
FIG. 1 is a schematic diagram of the magnetic amplifiers, and part of the control circuit, of the electric welder provided by the present invention, FIGS. 2A and 2B constitute a schematic diagram of the rest of the control circuit of that electric welder.
FIG. 6 is a schematic showing of three components which can selectively provide command signals for the electric welder.

The numerals 30, 32 and 34 denote conductors which are connectable to a suitable supply of three phase A.C. by a standard and usual master switch or circuit breaker, not shown. The numerals 36, 38, 40, 42, 44, 46, 48, 50, 52, 54 56, 58, 60, 62, 64 and 66 denote terminals on a terminal board which can have removable "jumpers" secured thereto. A fixed jumper 68 permanently interconnects terminals 40 and 46.

The numeral 70 denotes a relay coil which controls contacts 72, 74 and 76 that are interposed, respectively, between conductor 30 and terminal 36, conductor 32 and terminal 44, and conductor 34 and terminal 52. A transformer 78 has a primary winding 80 connected between terminals 60 and 64, a primary winding 82 connected between terminals 62 and 66, and a secondary winding 84 connected to relay coil 70 by a single-pole, single-throw switch 86.

The numeral 88 generally denotes the core of a magnetic amplifier which has windings 92, 94, 96, 98, 100, 102, 104 and 106 thereon. The numeral 108 generally denotes the core of a second magnetic amplifier which has windings 112, 114, 116, 118, 120, 122, 124 and 126 thereon. The numeral 134 generally denotes a third magnetic amplifier core which has windings 138, 140, 142, 144, 146 and 148 thereon. The numeral 150 generally denotes the core of a fourth magnetic amplifier which has windings 154, 156 158, 160, 162 and 164 thereon. Those magnetic amplifiers are wired in the familiar Scott connection configuration and are connectable to the three phase A.C. supply by conductors 30, 32 and 34 and relay contacts 72, 74 and 76. The cores of those magnetic amplifiers can have any of the circular, oval, rectangular or other configurations which are customarily provided for the cores of magnetic amplifiers. Windings 100, 120, 142 and 158 are secondary windings that are used as control windings, windings 102, 122, 144 and 160 are secondary windings that are used as power output windings, and windings 104, 106, 124, 126, 146, 148, 162 and 164 are secondary windings that are used as auxiliary windings. In the preferrred embodiments of the present invention, each of the control windings and each of the power output secondary windings has the same number of turns; but the number of turns on those control windings can be made larger or smaller than the numbers of turns on those power output secondary windings.

Whenever the power supply of the present invention is to be operated on 220 volts A.C., terminal 64 will be connected to terminal 66 by a jumper 178, and terminal 62 will be connected to terminal 60 by a jumper 176. Also, terminals 36 and 38 will be connected by a jumper 170, terminals 44 and 46 will be connected by a jumper 172, terminals 48 and 50 will be connected by a jumper 180, terminals 52 and 54 will be connected by a jumper 182, and terminals 56 and 58 will be connected by a jumper 174. Further, terminals 36 and 90 will be connected, terminals 38 and 110 will be connected, terminals 44 and 130 will be connected, terminals 40 and 132 will be connected, terminals 48 and 136 will be connected, terminals 56 and 152 will be connected, terminals 52 and 166 will be connected, and terminals 54 and 168 will be connected. In addition, terminal 50 will be connected to a tap 115 between windings 96 and 114, and terminal 58 will be connected to a tap 117 between windings 94 and 116. As a result, current will flow from conductor 32 via terminal 66, winding 82, terminal 62, jumper 176 and terminal 60 to conductor 34, while current also will flow from conductor 32 via terminal 66, jumper 178, terminal 64, winding 80 and terminal 60 to conductor 34. When switch 86 is closed, current from secondary winding 84 will energize relay coil 70 with consequent closing of relay contacts 72, 74 and 76. Current then will flow from conductor 30 via contacts 72, terminals 36 and 90, primary windings 92, 114, 96 and 118, terminals 132 and 40, jumper 68, terminal 46, jumper 172, terminal 44, and contacts 74 to conductor 32. Also, current will flow from conductor 30 via contacts 72, terminal 36, jumper 170, terminals 38 and 110, primary windings 112, 94, 116 and 98, terminals 130 and 44, and contacts 74 to conductor 32. In addition, current will flow from conductor 34 via contacts 76, terminals 52 and 166, primary windings 140 and 154, terminals 152 and 56, jumper 174, terminal 58, tap 117, primary windings 116 and 98, terminals 130 and 44, and contacts 74 to conductor 32. Further current will flow from conductor 34 via contacts 76, terminal 52, jumper 182, terminals 54 and 163, primary windings 156 and 138, terminals 136 and 48, jumper 180, terminal 50, tap 115, primary windings 96 and 118, terminals 132 and 40, jumper 68, terminal 46, jumper 172, terminal 44 and contacts 74 to conductor 32.

The primary windings between terminals 90 and 132 and between terminals 110 and 130 will be connected in parallel on 220 Volts A.C. but will be connected in series on 440 volts A.C. The secondary windings 102 and 122 are connected in series-opposing relation. The primary windings between terminals 166 and 152 and between terminals 168 and 136 will be connected in parallel for 200 volts A.C. but will be connected in series for 440 volts A.C. The secondary windings 144 and 160 are connected in series-opposing relation. Each of the cores 88 and 108 has sufficient ferrous cross section and enough primary winding turns thereon to enable the magnetic amplifiers, of which they are parts, to absorb at least one-half of the voltage across conductors 30 and 32 without becoming saturated. Each of the cores 134 and 150 has sufficient ferrous cross section and enough primary winding turns thereon to enable the magnetic amplifiers, of which they are parts, to absorb at least one-half of the voltage across conductors 34 and 32 multiplied by the cosine of thirty degrees without becoming saturated. The magnetic amplifiers, of which the cores 88, 108, 134 and 150 are parts, perform isolating and voltage-reducing functions as well as their other functions.

A conductor 317 coacts with a diode 316 to connect the collector-emitter circuit of an NPN transistor 300 across the terminals of control winding 100; and that transistor can be rendered conductive to essentially reduce the voltage across that control winding to zero. That transistor will subsequently be rendered non-conductive, as the core 108 becomes saturated and winding 100 applies a signal to terminal 296. A diode 318 and conductor 317 coact to connect the collector-emitter circuit of transistor 300 across the terminals of control winding 120; and that transistor can be rendered conductive to essentially reduce the voltage across that control winding to zero. That transistor will subsequently be rendered non-conductive, as the core 88 becomes saturated and winding 120 applies a signal to terminal 296. A diode 336 and conductor 317 coact to connect the collector-emitter circuit of an NPN transistor 324 across the terminals of control winding 142; and that transistor can be rendered conductive to essentially reduce the voltage across that control winding to zero. That transistor will subsequently be rendered non-conductive, as the core 150 becomes saturated and winding 142 applies a signal to terminal 320. A diode 338 and conductor 317 coact to connect the collector-emitter circuit of transistor 324 across the terminals of control winding 158; and that transistor can be rendered conductive to essentially reduce the voltage across that control winding to zero. That transistor will subsequently be rendered non-conductive, as the core 134 becomes saturated and winding 158 applies a signal to terminal 320. The conductor 317 is connected to signal ground by a conduct or 194.

When A.C. is applied to the primary windings 92, 94, 96 and 98 on magnetic core 88, those windings will induce a voltage across the control winding 100; and when A.C. is applied to the primary windings 112, 114, 116 and 118 on magnetic core 108, those windings will induce a voltage across the control winding 120. Similarly, when A.C. is applied to the primary windings 138 and 140 on magnetic core 134, those windings will induce a voltage across the control winding 142; and when A.C. is applied to the primary windings 154 and 156 on magnetic core 150, those windings will induce a voltage across the control winding 158. During half of the alternations of the A.C., the voltage induced in the control windings 100 and 120 will simultaneously make the upper ends of those windings positive; but it will be noted that whereas the top of control winding 100 is connected to the collector of transistor 300 by diode 316, it is the bottom of control winding 120 which is connected to that collector by diode 318. This means that whenever the upper ends of control windings 100 and 120 are simultaneously positive, only the control winding 100 can apply a positive voltage to the collector of transistor 300. Conversely, when the lower ends of control windings 100 and 120 are simultaneously positive, only the control winding 120 can apply a positive voltage to that collector. Similarly, during half of the alternations of the A.C., the voltages induced in the control windings 142 and 158 will simultaneously make the upper ends of those windings positive; but it will be noted that whereas the top of control winding 142 is connected to the collector of transistor 324 by diode 336, it is the bottom of control winding 158 which is connected to that collector by diode 338. This means that whenever the upper ends of control windings 142 and 158 are simultaneously positive, only the control winding 142 can apply a positive voltage to the collector of transistor 324. Conversely, when the lower ends of control windings 142 and 158 are simultaneously positive, only the control winding 158 can apply a positive voltage to that collector. This means that the control windings 100 and 120 can alternatively apply positive voltages to the collector of transistor 300, and that the control windings 142 and 158 can alternately apply positive voltages to the collector of transistor 324.

The numeral 192 denotes a conductor which connects secondary winding 122 to the anode of a diode 200; and conductor 194 connects secondary winding 102 to an output terminal 228 of the electric welder. When that welder is operated as a D.C. welder, terminal 228 is the negative terminal; but when that welder is operated as an A.C. welder, that terminal is just one of the A.C. terminals. Terminal 228 is connected to signal ground at all times. The numeral 196 denotes a conductor which connects secondary winding 160 to the anode of a diode 230; and numeral 198 denotes a conductor which connects secondary winding 144 to a fixed contact 242 of a double-pole double-throw switch 234. That switch has three additional fixed contacts 240, 244, and 246, and it has two movable contacts 248 and 250 that are ganged together. A diode 232 has its cathode connected to fixed contact 240 and to the cathode of diode 230, and has its anode connected to signal ground via conductors 317 and 194.

The movable contact 248 and the cathode of diode 200 are connected together and, via the series-connected primary windings of two current transformers 204 and 208, to a junction which is directly connected to an output terminal 226 of the electric welder and, via a swinging choke 220, to an output terminal 222 of that welder. When that welder is operated as a D.C. welder, terminal 222 will be the positive terminal; but when that welder is operated as an A.C. welder, terminal 222 will supply low current A.C. and terminal 226 will supply high current A.C. A terminal 224 is provided at which a voltage feedback signal can appear.

The swinging choke 220 has a laminated core; and one-half of the laminations provide continuous paths for magnetic flux whereas the other half of those laminations have air gaps therein. The continuous-path laminations have sufficient mass to cause the choke to act as a high inductance (up to 100 millihenrys) on low levels of A.C. current, but, at high levels of A.C. current, the continuous-path laminations quickly saturate to enable the choke to have a low inductance (as low as 3 millihenrys).

The cores of current transformers 204 and 208 are made from exceedingly-permeable, wound, silicon steel tapes; and hence those cores saturate in response to even small values of magnetic flux. The secondary winding 202 of current transformer 204 and the secondary winding 206 of current transformer 208 are connected in series with a resistor 216 and the secondary winding 210 of a transformer which has a core 212 and a primary winding 214. The junction of resistor 216 and of secondary winding 210 is connected to signal ground, and the other end of resistor 216 is connected to a terminal 218 at which a current feedback signal can appear. The current transformers 204 and 208 can operate as a current transformer for D.C. as well as for A.C. Specifically, when 6 volts A.C. are developed across secondary winding 210, the flow of direct current through the primary windings of current transformers 204 and 208 will saturate the core of one of those transformers during the positive-going alternations of that 6 volt A.C. and will saturate the core of the other of those transformers during the negative-going alternations of that A.C. Consequently, one of the cores is saturated throughout essentially one-half of the time, while the other of those cores is saturated throughout essentially the rest of the time. The cores flux-balance each other; and each unsaturated core will cause its secondary winding to deliver a current which is determined by the three ohm resistance of resistor 216. As a result, the current flowing through that resistor will always be proportional to the current which is flowing through the primary winding on the core which is not in saturation at that time. The combination of current transformers 204 and 208, of the transformer which has core 212, and of resistor 216 enables a usable current feedback signal to appear at terminal 218 whether the electric welder is being operated as an A.C. or D.C. welder.

The winding 104 on core 88 and the winding 124 on core 108 are connected in series-aiding relation and to the input terminals of a bridge rectifier 256, and also to the anodes of diodes 268 and 270 which coact with the left-hand diodes of bridge rectifier 256 to constitute a second bridge rectifier. An eight-volt Zener diode 258 and a resistor 260 are connected in series across the output terminals of bridge rectifier 256, and the anode of that Zener diode and one output terminal of that bridge rectifier are grounded. A resistor 262 is connected in parallel with that Zener diode; and the junction between resistors 260 and 262 is connected by a shielded conductor 264 and terminals 266 and 602 to the base of an NPN transistor 600 in FIG. 2A. The winding 146 on core 134 and the winding 162 on core 150 are connected in series-aiding relation and to the input terminals of a bridge rectifier 278, and also to the anodes of diodes 286 and 288 which coact with the left-hand diodes of bridge rectifier 278 to constitute a further bridge rectifier. An eight-volt Zener diode 280 and a resistor 282 are connected in series across the output terminals of bridge rectifier 278; and the anode of that Zener diode and one output terminal of that bridge rectifier are grounded. A resistor 284 is connected in parallel with the Zener diode; and the junction between resistors 282 and 284 is connected by a shielded conductor 283 and terminals 285 and 287 to the base of an NPN transistor 666 in FIG. 2A. The cathodes of diodes 268 and 270 are connected together by a junction 272 and the cathodes of diodes 286 and 288 are connected together by a junction 274; and those junctions are connected to a resistor 254 and to the anode of a diode 290 by a junction 276. Whenever the electric welder is to be operated as a pulse D.C. welder, a thermal circuit breaker 252 will be closed to connect the junctions 272 and 274 to fixed contact 246 of switch 234. However, when that electric welder is operated as an A.C. welder, that thermal circuit breaker will be left open; or it will, if left closed, trip due to excessive current.

The cathode of diode 290 is connected by a junction 292 to parallel-connected resistor 304 and capacitor 306; and that capacitor will be charged so a positive voltage appears at its left-hand terminal. The right-hand terminals of resistor 304 and capacitor 306 are connected to signal ground by conductors 317 and 194. Junction 292 and a junction 294 connect the cathode of diode 290 to the cathodes of diodes 314 and 334. Diode 314 and parallel-connected resistor 304 and capacitor 306 are connected across the collector-emitter circuit of transistor 300; and diode 334 and that parallel-connected resistor and capacitor are connected across the collector-emitter circuit of transistor 324. Resistor 310 and capacitor 308 also are connected across the collector-emitter circuit of transistor 300; and resistor 328 and capacitor 330 also are connected across the collector-emitter circuit of transistor 324. A diode 312 has its anode connected to the collector of transistor 300 and has its cathode connected to the junction between resistor 310 and capacitor 308; and a diode 332 has its anode connected to the collector of transistor 324 and has its cathode connected to the junction between resistor 328 and capacitor 330. Resistor 302 is connected between the emitter and base of transistor 300; and resistor 326 is connected between the emitter and base of transistor 324. The collector of transistor 300 is connected to the cathode of a diode 626 in FIG. 2B by terminals 296 and 628; and the collector of transistor 324 is connected to the cathode of a diode 688 by terminals 320 and 690. The emitter of an NPN transistor 658 is connected to the base of transistor 300 by a diode 662, terminals 664 and 298, and a shielded conductor 297; and the emitter of an NPN transistor 724 is connected to the base of transistor 324 by a diode 728, terminals 730 and 322, and a shielded conductor 321.

Winding 148 on core 134 and winding 164 on core 150 are connected in series-aiding relation to supply power to the primary winding 214 of the transformer which has the core 212, and also to a pilot light 340, a fan motor 342 and, via a fuse 344, to an outlet plug 346 which supplies 120 volts 60 cycle A.C. Winding 106 on core 88 and winding 126 on core 108 are connected in series-aiding relation to supply 15 volts 60 cycle A.C. to terminals 348 and 350 which are connected to terminals 352 and 354 in FIG. 2B. A bridge rectifier 360 is connected across the latter terminals; and a filter capacitor 362 is connected across the output terminals of that bridge rectifier. The lower terminals of that capacitor and of that bridge rectifier, and the cathode of a diode 366 are connected to machine ground. The upper terminals of that capacitor and of that bridge rectifier are connected to one terminal of a voltage regulator 364, of standard and usual design, by a junction 363; and that junction serves as a source of unregulated 15 volts D.C. A second terminal of voltage regulator 364 is connected to the anode of diode 366, to signal ground, and to a terminal 370 which is connected to a terminal 376 in FIG. 6. The remaining terminal of voltage regulator 364 is connected to an arrow 372 which represents 12 volts regulated D.C. and which is connected to all other arrows on the various sheets of the drawing. That remaining terminal of voltage regulator 364 is also connected to a terminal 368 which is connected to a terminal 374 in FIG. 6. Terminals 374 and 376 are connected to a thumbwheel switch 378 which performs the function of a potentiometer and which has the middle contact thereof connected to the right-hand contact of a remotely-located thumbwheel switch 380, to one terminal of a resistor 382, and to a fixed contact 386 of a selector switch that has additional fixed contacts 388 and 390 and a movable contact 392. One terminal of the remotely-located thumbwheel switch 380 is connected to signal ground, and the movable contact is connected to the other terminal of resistor 382 and to fixed contact 388. A programmer 384 has one terminal thereof connected to signal ground and has another terminal thereof connected to fixed contact 390. The movable contact 392 is connected to one terminal of a contactor 394, of standard and usual design, which is mounted on the welding torch, and also to a terminal 395 which is connected to terminal 398 in FIG. 2A.

The numeral 400 denotes a resistor which is connected in series with a potentiometer 402 between the regulated 12 volts D.C. and signal ground. A resistor 404 connects the movable contact of that potentiometer to the inverting input of an operational amplifier 406 which has a ten kilohm resistor in the negative feedback loop thereof. The output of that operational amplifier is spaced from machine ground by a resistor 408; and a conductor 409 and a diode 410 connect that output to the non-inverting input of an operational amplifier 412 which has a ten kilohm resistor in the negative feedback loop thereof. A terminal 414 is connected to the terminal 218 in FIG. 1 to receive current feedback signals from that terminal; and a resistor 416 applies those signals to the inverting input of an operational amplifier 418 which has a diode 420 and a one percent ten kilohm resistor in the negative feedback loop thereof. The non-inverting input of that operational amplifier is spaced from signal ground by a resistor 421. Diode 420 and a resistor 422 connect the output of operational amplifier 418 to the non-inverting input of operational amplifier 412. The output of the latter operational amplifier is spaced from signal ground by a resistor 424; and conductor 425 and resistors 426 and 433 connect the output of operational amplifier 412 to the non-inverting input of operational amplifier 436 which has a ten kilohm resistor in the negative feedback loop thereof. A diode 438 is connected between signal ground and the non-inverting input of that operational amplifier. An adjustable resistor 428, conductor 429, and a resistor 430 are connected in series between signal ground and the inverting input of an operational amplifier 432 which has a twenty-two kilohm resistor in the negative feedback loop thereof. A capacitor 435 connects the output of that operational amplifier to the junction between resistors 426 and 433. The output of operational amplifier 436 is spaced from signal ground by a resistor 440 and is connected to one terminal of a potentiometer 532, to a fixed contact 456 of a selector switch 454, and to a terminal 444 in FIG. 1 by a terminal 442. A resistor 448 is connected between terminal 444 and an ammeter 452 which has the other terminal thereof connected to a terminal 446 that is connected to signal ground. A capacitor 450 is connected between the terminals of that ammeter.

The movable contact of potentiometer 532 is connected to fixed contact 458 of switch 454; and fixed contact 460 of that switch is connected to the other terminal of potentiometer 532 and to a terminal 520. The movable contact 462 of that switch is connected by a resistor 464 to the non-inverting input of an operational amplifier 466 which has a ten kilohm resistor in the negative feedback loop thereof. The output of that operational amplifier is spaced from signal ground by a resistor 468, and is connected by an adjustable resistor 470 and a resistor 472 to the inverting input of an operational amplifier 480 which has a one megohm resistor and a five-thousandths of a microfarad capacitor in the negative feedback loop thereof. A resistor 482 connects terminal 398 to the non-inverting terminal of that operational amplifier.

Figure 2:
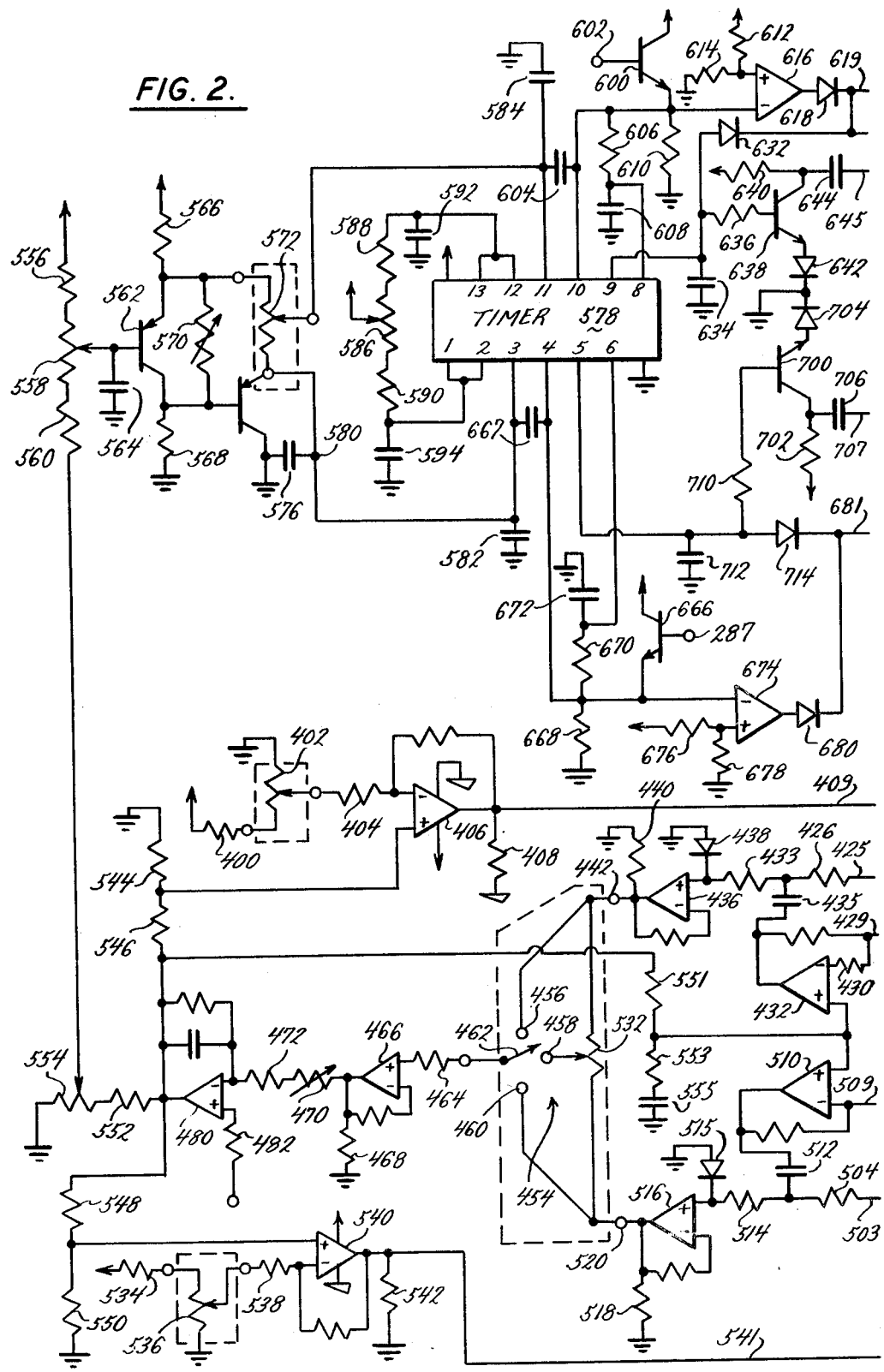
Figure 2B:
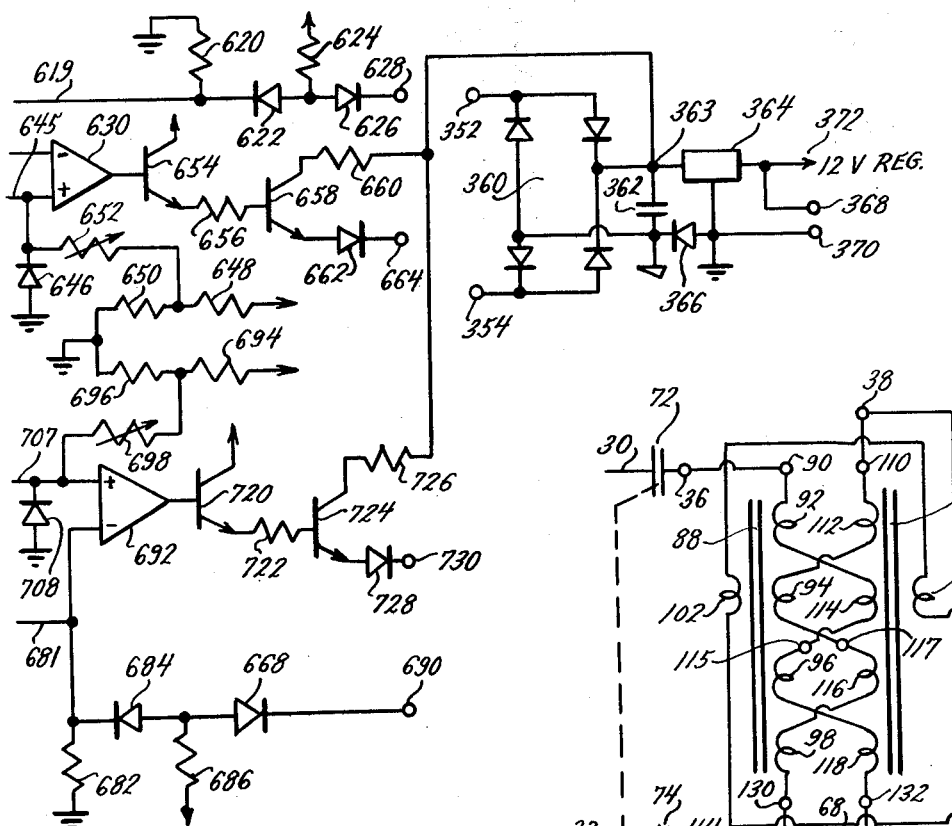

Resistors 486 and 488 in FIG. 2B are connected as a voltage divider between terminal 484 and signal ground; and that terminal is connected to, and receives a voltage feedback signal from, terminal 224 in FIG. 1. A resistor 490 connects the junction between resistors 486 and 488 to the inverting input of an operational amplifier 492 which has a diode 494 and a one percent ten kilohm resistor in the negative feedback loop thereof. A resistor 493 is connected between signal ground and the non-inverting input of that operational amplifier. Diode 494 and a resistor 496 connect the output of that operational amplifier to the anode of a diode 498 and also to the non-inverting input of an operational amplifier 500 which has a ten kilohm resistor in the negative feedback loop thereof. The output of operational amplifier 500 is spaced from signal ground by a resistor 502, and conductor 503 and resistors 504 and 514 connect that output to the non-inverting input of an operational amplifier 516 which has a ten kilohm resistor in the negative feedback loop thereof. A diode 515 is connected between signal ground and that non-inverting input. An adjustable resistor 506, a resistor 508, and a conductor 509 are connected between signal ground and the inverting input of an operational amplifier 510 which has a twenty-two kilohm resistor in the negative feedback loop thereof. The output of that operational amplifier is connected, by a capacitor 512, to the junction between resistors 504 and 510. The output of operational amplifier 516 is displaced from signal ground by a resistor 518; and it is connected to terminal 520, and hence to a terminal 522 in FIG. 1. A resistor 526 is connected between terminal 522 and a voltmeter 530 which has the other terminal thereof connected to signal ground by a terminal 524. A capacitor 528 is connected across the terminals of that voltmeter.

The numeral 534 in FIG. 2A denotes a resistor which is connected in series between 12 volts regulated D.C. and ground by a potentiometer 536. A resistor 538 connects the movable contact of that potentiometer to the inverting input of an operational amplifier 540 which has a ten kilohm resistor in the negative feedback loop thereof. The output of that operational amplifier is displaced from signal ground by a resistor 542, and is connected to the cathode of diode 498 by a conductor 541.

The output of the operational amplifier 480 is connected to signal ground by series-connected resistors 546 and 544, by series-connected resistors 548 and 550, and by series-connected resistor 552 and potentiometer 554. That output also is connected to the non-inverting inputs of operational amplifiers 432 and 510 by a resistor 551; and those inputs are spaced from signal ground by series-connected resistor 553 and capacitor 555. In addition, that output is connected to the non-inverting input of operational amplifier 406 by resistor 546, and is connected to the non-inverting input of operational amplifier 540 by resistor 548.

A resistor 556, a potentiometer 558 and a resistor 560 are connected in series between 12 volts regulated D.C. and the movable contact of potentiometer 554. The movable contact of potentiometer 558 is connected to the base of a PNP transistor 562; and a capacitor 564 is connected between that base and signal ground. A resistor 566 connects 12 volts regulated D.C. to the emitter of that transistor, to one terminal of an adjustable resistor 570, and to one terminal of a potentiometer 572. The collector of transistor 562 is displaced from signal ground by a resistor 568, is connected to the other terminal of adjustable resistor 570, and is connected to the base of a PNP transistor 574. The latter transistor has the emitter thereof connected to the other terminal of potentiometer 572 and has the collector thereof connected to signal ground. A capacitor 576 is connected between signal ground and a junction 580, which is connected to the emitter of transistor 574, to the other terminal of potentiometer 572, and to pin 3 of a timer 578. A capacitor 582 displaces that pin from signal ground. The movable contact of potentiometer 572 is connected to pin 11 of that timer; and a capacitor 584 displaces that pin from signal ground. A potentiometer 586 has one terminal thereof connected to pins 12 and 13 of timer 578 by a resistor 588; and those pins are spaced from signal ground by a capacitor 592. The movable contact of that potentiometer is connected to 12 volts regulated D.C.; and the other terminal of that potentiometer is connected to pins 1 and 2 of timer 578 by a resistor 590. Those pins are spaced from signal ground by a capacitor 594. A capacitor 604 is connected between pins 11 and 10 of timer 578; and pin 10 is connected to the emitter of transistor 600, to the inverting input of an amplifier 616, to one terminal of a grounded resistor 610, and to series-connected resistor 606 and capacitor 608 which extend to signal ground. The junction between capacitor 608 and resistor 606 is connected to pin 8 of timer 578. Resistors 612 and 614 are connected between 12 volts regulated D.C. and signal ground to supply a fixed voltage to the non-inverting input of amplifier 616. A diode 618 and a conductor 619 connect the output of that amplifier to the inverting input of an amplifier 630; and that input is displaced from signal ground by a resistor 620. A resistor 624 is connected between 12 volts regulated D.C. and the anodes of diode 626 and of a diode 622 which has its cathode thereof connected to the inverting input of an amplifier 630 by conductor 619. A diode 632 connects pin 9 of timer 578 to the inverting input of amplifier 630; and a resistor 636 connects that pin to the base of an NPN transistor 638 which has the emitter thereof connected to signal ground by a diode 642. A capacitor 634 is connected between pin 9 of timer 578 and signal ground. A resistor 640 connects 12 volts regulated D.C. to the collector of transistor 638; and that collector is coupled to the non-inverting input of amplifier 630 by a capacitor 644 and a conductor 645. A diode 646 in FIG. 2B is connected between signal ground and that non-inverting input. Resistors 648 and 650 constitute a voltage divider between 12 volts regulated D.C. and signal ground; and an adjustable resistor 652 is connected from the junction between those resistors to the non-inverting input of amplifier 630. The output of that amplifier is connected to the base of an NPN transistor 654 which has the collector thereof connected to 12 volts regulated D.C. and which has the emitter thereof connected to the base of the transistor 658 by a resistor 656. The collector of transistor 658 is connected to the 15 volts unregulated D.C. at junction 363 by a resistor 660.

A capacitor 667 in FIG. 2A is connected between pins 3 and 4 of timer 578; and pin 4 is connected to the inverting input of an amplifier 674, to the emitter of transistor 666, and, via resistor 670, to pin 6 of that timer. A resistor 668 displaces that emitter from signal ground. A capacitor 672 is connected between resistor 670 and signal ground. The collector of transistor 666 is connected to the 12 volts regulated D.C. Resistors 676 and 678 constitute a voltage divider connected between the 12 volts regulated D.C. and signal ground, and the junction between those resistors applies a fixed voltage to the non-inverting input of amplifier 674. A diode 680 and a conductor 681 connect the output of that amplifier to the inverting input of an amplifier 692 in FIG. 2B; and a resistor 682 displaces that inverting input from signal ground. A resistor 686 connects 12 volts regulated D.C. to the anode of a diode 684 which has the cathode thereof connected to the inverting input of amplifier 692; and that resistor also connects that 12 volts regulated D.C. to the anode of diode 688.

Resistors 694 and 696 constitute a voltage divider connected between 12 volts regulated D.C. and signal ground; and an adjustable resistor 698 connects the junction between those resistors to the non-inverting input of amplifier 692. An NPN transistor 700 in FIG. 2A has the emitter thereof connected to signal ground by a diode 704, and has the collector thereof connected to 12 volts regulated D.C. by a resistor 702. A capacitor 706 and a conductor 707 couple that collector to the non-inverting input of amplifier 692; and a diode 708 is connected between ground and that input. Pin 5 of timer 578 is connected to the inverting input of amplifier 692 by a diode 714 and conductor 681; and a capacitor 712 displace that pin from signal ground. A resistor 710 connects pin 5 to the base of transistor 700.

The numeral 720 in FIG. 2B denotes an NPN transistor which has the collector thereof connected to the 12 volts regulated D.C., and which has the base thereof connected to the output of amplifier 692. A resistor 722 connects the emitter of transistor 720 to the base of transistor 724 which has the collector thereof connected to the 15 volts unregulated D.C. at junction 363 by a resistor 726.

The two magnetic amplifiers, of which the cores 88 and 108 are parts, will constitute a frequency doubler; and, if the control winding 100 saturates the core 88 during part of a half-cycle of one polarity of the 60 cycle A.C. and if the control winding 120 saturates the core 108 during part of a half-cycle of the opposite polarity of that 60 cycle A.C., the voltage across secondary winding 102 will be displaced one hundred and eighty degrees from the voltage across secondary winding 122. As a result, that frequency doubler can provide one hundred and twenty welding pulses per second. The two magnetic amplifiers, of which the cores 134 and 150 are parts, will constitute a frequency doubler; and, if the control winding 142 saturates the core 134 during part of a half-cycle of one polarity of the 60 cycle A.C. and if the control winding 158 saturates the core 150 during part of a half-cycle of the opposite polarity of that 60 cycle A.C., the voltage across secondary winding 144 will be displaced one hundred and eighty degrees from the voltage across secondary winding 160. Also, the voltage across secondary winding 144 will be displaced ninety degrees from the voltage across secondary winding 102, and the voltage across secondary winding 160 will be displaced ninety degrees from the voltage across secondary winding 122. As a result, the four magnetic amplifiers can provide two hundred and forty welding pulses per second.

Generation of Timing Pulses

Windings 104 and 124, on cores 88 and 108, will develop pure 60 cycle A.C. whenever relay contacts 72, 74 and 76 are closed; and, as long as the transistor 300 is in its non-conductive state, winding 100 on coil 88 will develop pure 60 cycle A.C., and winding 120 on core 108 will develop pure 60 cycle A.C. Bridge rectifier 256 will respond to the 60 cycle A.C. from windings 104 and 124 to apply one hundred and twenty positive-going half-waves per second to series-connected resistor 260 and Zener diode 258 and its paralleling resistor 262; and the root mean square of those half-waves will be about fifty volts. Diode 316 will respond to 60 cycle A.C. of one polarity from winding 100 to apply sixty positive-going half-waves per second to the cathode of diode 626 via terminals 296 and 628; and diode 318 will respond to 60 cycle A.C. of the opposite polarity from winding 120 to apply a further sixty positive-going half-waves per second to that cathode.

The voltage which resistor 624, diode 622 and resistor 620 normally apply to the anode of diode 626 will be less than the root mean square of the one hundred and twenty positive-going half-waves per second which windings 100 and 120 and diodes 316 and 318 normally apply to the cathode of diode 626; and hence that diode will normally be back-biased and non-conductive. The one hundred and twenty positive-going half-waves per second which windings 104 and 124 and bridge rectifier 256 apply to series-connected resistor 260 and Zener diode 258 and its paralleling resistor 262 will cause the voltage at the base of transistor 600 to promptly rise from zero to eight volts immediately after the start of each half-cycle of the A.C. across those windings, to remain at eight volts throughout essentially the full duration of that half-cycle, and to promptly fall back to zero at the end of that half-cycle. That transistor will respond to the eight volts at its base to conduct at the saturation level; and hence a large positive voltage will be applied directly to pin 10 of timer 578 and to the inverting input of amplifier 616 and, via the RC network constituted by resistor 606 and capacitor 608, to pin 8 of that timer. Because those pins respond only to negative going pulses, the large positive voltage from transistor 600 will not trigger that timer; but, because that large positive voltage is much larger than the voltage which resistors 612 and 614 apply to the non-inverting input of amplifier 616, that large positive voltage will cause that amplifier to apply a negative voltage to the anode of diode 618 which will back-bias that diode and render it non-conductive. The non-conductive states of diodes 626 and 618 will enable resistor 624, diode 622 and resistor 620 to apply a voltage to the inverting input of amplifier 630 which is greater than the four volts that resistors 648 and 650 and adjustable resistor 652 normally apply to the non-inverting input of that amplifier; and hence that amplifier will, during essentially each of the one hundred and twenty half-cycles, apply a negative voltage to the base of transistor 654—thereby rendering that transistor non-conductive with consequent rendering of transistors 658 and 300 non-conductive. All of this means that until a command signal is applied to timer 278, pins 8 and 10 of that timer will not be triggered, and transistors 654, 658 and 300 will be non-conductive, during essentially the full duration of each of the one hundred and twenty half-cycles which are developed by bridge rectifier 256.

As the voltage at the base of transistor 600 falls to zero, at the end of each of the one hundred and twenty half-cycles which are developed by bridge rectifier 256, that transistor will become non-conductive; and the resulting negative-going signal at its emitter will be applied directly to pin 10 of timer 578 and to the inverting input of amplifier 616 and will, after a slight delay which is determined by the time constant of the RC network constituted by resistor 606 and capacitor 608, be applied to pin 8 of that timer. If, at the time that negative-going signal is applied to pin 10, zero voltage rather than a positive-going signal is present at pin 9, the timer 578 will maintain zero voltage at pin 9 until the delayed negative-going signal is applied to pin 8. However, if a positive-going signal is developing at pin 9, at the instant the negative-going signal is applied to pin 10, the timer 578 will respond to that negative-going signal to drive the developing positive-going signal at pin 9 down to zero. In either event, that timer will not start to develop a positive-going signal at pin 9 until a short fixed time after a zero crossing of the A.C. from windings 104 and 124; and hence all of those positive-going signals will be equally spaced apart and will have a known relation to the zero crossings of that A.C.

Whenever a positive-going signal is being developed at pin 9, at the instant the negative-going signal is applied to pin 10, the driving of that positive-going signal down to zero will cause pin 9 to apply a momentary negative-going signal to the anode of diode 632 and to the base of transistor 638. That negative-going signal would cause a positive-going signal to appear at the collector of transistor 638, and capacitor 644 would apply that positive-going signal to the non-inverting input of amplifier 630; but that negative-going signal at pin 9 also would tend to reduce the valve of the voltage at the inverting input of that amplifier. Any such reduction in voltage at that inverting input would be undesirable; because, if that voltage were to fall below the voltage at the non-inverting input of amplifier 630, the output of that amplifier would become positive and would prematurely render transistors 654, 658 and 300 conductive. The circuit of FIGS. 2A and 2B keeps any momentary negative-going signal at pin 9 from lowering the voltage at the inverting input of amplifier 630 below the voltage at the non-inverting input of that amplifier; and it does so by having the inverting input of amplifier 616 receive the negative-going signal from the emitter of transistor 600 and by having diode 618 apply the resulting positive voltage at the output of that amplifier to the inverting input of amplifier 630. Specifically, amplifier 616 will respond to the negative-going signal at the emitter of transistor 600 to develop a positive voltage at the output thereof which will forward-bias diode 618, and will thereby apply a voltage to the inverting input of amplifier 630 which will hold the voltage at that input well above the voltage at the non-inverting input of that amplifier. As a result, the amplifier 630 will continue to apply a negative voltage to the base of transistor 654 to continue to hold that transistor and transistors 658 and 300 non-conductive. In this way the circuit of FIGS. 2A and 2B permits any positive-going signal, which is developing at pin 9 of timer 578 at the time the negative-going signal is developed at the emitter of transistor 600, to be driven down to zero without any risk of a premature rendering of any of transistors 654, 658 and 300 conductive.

In similar fashion, windings 146 and 162, on cores 134 and 150, will develop pure 60 cycle A.C. whenever relay contacts 72, 74 and 76 are closed; and, as long as the transistor 324 is in its non-conductive state, winding 142 on core 134 will develop a pure 60 cycle A.C., and winding 158 on core 150 will develop a pure 60 cycle A.C. Bridge rectifier 278 will respond to the 60 cycle A.C. from windings 146 and 162 to apply one hundred and twenty positive-going half-waves per second to series-connected resistor 282 and Zener diode 280 with its paralleling resistor 284; and the root mean square of those half-waves will be about fifty volts. Those half-waves will be displaced ninety degrees from the half-waves which bridge rectifier 256 applies to series-connected resistor 260 and Zener diode 258 and its paralleling resistor 262. Diode 336 will respond to 60 cycle A.C. of one polarity from winding 142 to apply sixty positive-going half-waves per second to the cathode of diode 688 via terminals 320 and 690; and diode 338 will respond to 60 cycle A.C. of the opposite polarity from winding 158 to apply a further sixty positive-going half-waves per second to that cathode. Those half-waves will be displaced ninety degrees from the half-waves which diodes 316 and 318 apply to the cathode of diode 626 via terminals 296 and 628.

The voltage which resistor 686, diode 684 and resistor 682 normally apply to the anode of diode 688 will be less than the root mean square of the one hundred and twenty positive-going half-waves per second which windings 142 and 158 and diodes 336 and 338 normally apply to the cathode of diode 688; and hence that diode will normally be back-biased and non-conductive. The one hundred and twenty positive-going half-waves per second which windings 146 and 162 and bridge rectifier 278 apply to series-connected resistor 282 and Zener diode 280 and its paralleling resistor 284 will cause a voltage at the base of transistor 666 to promptly rise from zero to eight volts immediately after the start of each half-cycle of the A.C. across those windings, to remain at eight volts throughout essentially the full duration of that half-cycle, and to promptly fall back to zero at the end of that half-cycle. That transistor will respond to the eight volts at its base to conduct at the saturation level; and hence a large positive voltage will be applied directly to pin 4 of timer 578 and to the inverting input of amplifier 674 and, via the RC network constituted by resistor 670 and capacitor 672, to pin 6 of that timer. Because those pins respond only to negative-going pulses, the large positive voltage from transistor 666 will not trigger that timer; but because that large positive voltage is much larger than the voltage which resistors 676 and 678 apply to the non-inverting input of amplifier 674, that large positive voltage will cause that amplifier to apply a negative voltage to the anode of diode 680 which will back-bias that diode and render it non-conductive. The non-conductive states of diodes 688 and 680 will enable resistor 686, diode 684 and resistor 682 to apply a voltage to the inverting input of amplifier 692 which is greater than the four volts that resistors 694 and 696 and adjustable resistor 698 normally apply to the non-inverting input of that amplifier; and hence that amplifier will, during essentially the full duration of each of the one hundred and twenty half-cycles which are developed by bridge rectifier 278, apply a negative volage to the base of transistor 720—thereby rendering that transistor non-conductive with consequent rendering of transistors 724 and 324 non-conductive. All of this means that until a command signal is applied to the timer 578, pins 4 and 6 of that timer will not be triggered, and transistors 720, 724 and 324 will be non-conductive, during essentially the full duration of each of the one hundred and twenty half-cycles which are developed by bridge rectifier 278.

As the voltage at the base of transistor 666 falls to zero, at the end of the one hundred and twenty half-cycles which are developed by bridge rectifier 278, that transistor will become non-conductive; and the resulting negative-going signal at its emitter will be applied directly to pin 4 of timer 578 and to the inverting input of amplifier 674 and will, after a slight delay which is determined by the time constant of the RC network constituted by resistor 670 and capacitor 672, be applied to pin 6 of that timer. If, at the time that negative-going signal is applied to pin 4, zero voltage rather than a positive-going signal is present at pin 5, the timer 578 will maintain zero voltage at pin 5 until the delayed negative-going signal is applied to pin 6. However, if a positive-going signal is developing at pin 5, at the instant the negative-going signal is applied to pin 4, the timer 578 will respond to that negative-going signal to drive the developing positive-going signal at pin 5 down to zero. In either event, that timer will not start to develop a positive-going signal at pin 5 until a short fixed time after a zero crossing of the A.C. from windings 146 and 162; and hence all of those positive-going signals will be equally spaced apart and will have a known relation to the zero crossings of that A.C.

Whenever a positive-going signal is being developed at pin 5, at the instant a negative-going signal is applied to pin 4, the driving of that positive-going signal down to zero will cause pin 5 to apply a momentary negative-going signal to the anode of diode 714 and to the base of transistor 700. That negative-going signal would cause a positive-going signal to appear at the collector of transistor 700, and capacitor 706 would apply that positive-going signal to the non-inverting input of amplifier 692; but that negative-going signal at pin 5 also would tend to reduce the value of the voltage at the inverting input of that amplifier. Any such reduction in voltage at that inverting input would be undesirable; because, if that voltage were to fall below the voltage at the non-inverting input of amplifier 630, the output of that amplifier would become positive and would prematurely render transistors 720, 724 and 324 conductive. The circuit of FIGS. 2A and 2B keeps any momentary negative-going signal at pin 5 from lowering the voltage at the inverting input of amplifier 692 below the voltage at the non-inverting input of that amplifier; and it does so by having the inverting input of amplifier 674 receive the negative-going signal from the emitter of transistor 666 and by having diode 680 apply the resulting positive voltage at the output of that amplifier to the inverting input of amplifier 692. Specificaly, amplifier 674 will respond to the negative-going signal at the emitter of transistor 666 to develop a positive voltage at the output thereof which will forward-biase diode 680, and will thereby apply a voltage to the inverting input of amplifier 692 which will hold the voltage at that input well above the voltage at the non-inverting input of that amplifier. As a result, the amplifier 692 will continue to apply a negative voltage to the base of transistor 720 to continue to hold that transistor and transistors 724 and 324 non-conductive. In this way the circuit of FIGS. 2A and 2B permits any positive-going signal, which is developing at pin 5 of timer 578, at the time the negative-going signal is developed at the emitter of transistor 666, to be driven down to zero without any risk of a premature rendering of any of transistors 720, 724 and 324 conductive.

The one hundred and twenty negative-going signals per second from Zener diode 280 will be displaced ninety degrees from the one hundred and twenty negative-going signals per second from Zener diode 258. As a result, timer 578 will receive two hundred and forty negative-going signals per second, and hence will start developing two hundred and forty positive-going signals per second. One hundred and twenty of those positive-going signals per second will develop at pin 9; and the other one hundred and twenty of those positive-going signals per second will develop at pin 5.

When the delayed negative-going signal, from the RC network constituted by resistor 606 and capacitor 608, is applied to pin 8 of timer 578, a positive-going signal will begin to develop at pin 9 of that timer; and that positive-going signal will be applied to the anode of diode 632 and to the base of transistor 638. That diode will respond to that positive-going signal to increase the voltage at the inverting input of amplifier 630; and the increased negative voltage at the output of that amplifier will continue to hold transistors 654, 658 and 300 non-conductive. The positive-going signal at the base of transistor 638 will render that transistor conductive; and the coupling, by capacitor 644, of the resulting negative-going signal at the collector of that transistor to the non-inverting input of amplifier 630 will help the signals, which diodes 622 and 632 apply to the inverting input of that amplifier, to maintain the negative output voltage which keeps transistors 654, 658 and 300 non-conductive.

When the delayed negative-going signal, from the RC network constituted by resistor 670 and capacitor 672, is applied to pin 6 of timer 578, a positive-going signal will begin to develop at pin 5 of that timer; and that positive-going signal will be applied to the anode of diode 714 and to the base of transistor 700. That diode will respond to that positive-going signal to increase the voltage at the inverting input of amplifier 692, and the increased negative voltage at the output of that amplifier will continue to hold transistors 720, 724 and 324 non-conductive. The positive-going signal at the base of transistor 700 will render that transistor conductive; and the coupling, by capacitor 706, of the resulting negative-going signal at the collector of that transistor to the non-inverting input of amplifier 692 will help the signals which diodes 684 and 714 apply to the inverting input of that amplifier to maintain the negative output voltage which keeps transistors 720, 724 and 324 non-conductive.

The timer 578 is, effectively, a two section timer which can act as two separate timers. As a result, the positive-going pulses which will be developed at pin 9 will not be dependent upon any signals that are applied to, or developed by, any of pins 1 through 6 of that timer. Similarly, the positive-going pulses which will be developed at pin 5 will not be dependent upon any signals that are applied to, or developed by, any of pins 8 through 13 of that timer.

Development of Welding Pulses

Prior to the end of the half-cycle during which the slightly-delayed negative-going signal at pin 8 of timer 578 caused the positive-going signal to start developing at pin 9, that timer will terminate that positive-going signal—either in response to a command signal set by thumbwheel switch 378, by remotely-located thumbwheel switch 380 or by programmer 384 or in response to the next-succeeding negative-going signal on pin 10. As the positive-going signal on pin 9 is terminated, transistor 638 will become non-conductive; and the resulting positive-going signal at its collector will be coupled to the non-inverting input of amplifier 630 by capacitor 644; and that positive-going signal at that collector will be larger than the eight volts at the inverting input of that amplifier. The resulting positive-going signal at the output of that amplifier will be applied to the base of transistor 654 to render that transistor conductive; and the base of transistor 658 will then receive a positive-going signal which will render that transistor conductive to cause the base of transistor 300 to receive a positive-going signal which will render that transistor conductive. All of this means that shortly after the beginning of each of the one hundred and twenty half-cycles which will render transistor 300 conductive, a timing pulse will be applied to pin 8 of timer 578 to initiate the development of a positive-going signal at pin 9; and, sometime before the end of that half-cycle, that positive-going signal will be driven to zero. As that positive-going signal is driven to zero, transistors 654, 658 and 300 will be rendered conductive.

In similar fashion, prior to the end of the half-cycle during which the slightly-delayed negative-going signal at pin 6 of timer 578 caused the positive-going signal to start developing at pin 5, that timer will terminate that positive-going signal—either in response to a command signal set by thumbwheel switch 378, by remotely-located thumbwheel switch 380 or by programmer 384 or in response to the next-succeeding negative-going signal on pin 4. As the positive-going signal on pin 5 is terminated, transistor 700 will become non-conductive, and the resulting positive-going signal at its collector will be coupled to the non-inverting input of amplifier 692 by capacitor 706; and that positive-going signal at that collector will be larger than the eight volts at the inverting input of that amplifier. The resulting positive-going signal at the output of that amplifier will be applied to the base of transistor 720 to render that transistor conductive; and the base of tansistor 724 will then receive a positive-going signal which will render that transistor conductive to cause the base of transistor 324 to receive a positive-going signal which will render that transistor conductive. All of this means that shortly after the beginning of each of the one hundred and twenty half-cycles which are developed by bridge rectifier 278, a timing pulse will be applied to pin 6 of timer 578 to initiate the development of a positive-going signal at pin 5; and, sometime before the end of that half-cycle, that positive-going signal will be driven to zero.

As that positive-going signal is driven to zero, transistors 720, 724 and 324 will be rendered conductive.

As long as both of the transistors 300 and 324 remain non-conductive, the waveform across control winding 100 will, at any given instant, be equal and opposite to the waveform across control winding 120, and the waveform across control winding 142 will, at that same instant, be equal and opposite to the waveform across control winding 158—although the waveforms across control windings 142 and 158 will be displaced ninety degrees from the waveforms across control windings 100 and 120. Also, as long as both of the transistors 300 and 324 remain non-conductive, the core 88 will not become saturated until the end of each voltage half-wave across control winding 100, the core 108 will not become saturated until the end of each voltage half-wave across control winding 120, the core 134 will not become saturated until the end of each voltage half-wave across control winding 142, and the core 150 will not become saturated until the end of each voltage half-wave across control winding 158.

Figure 3:
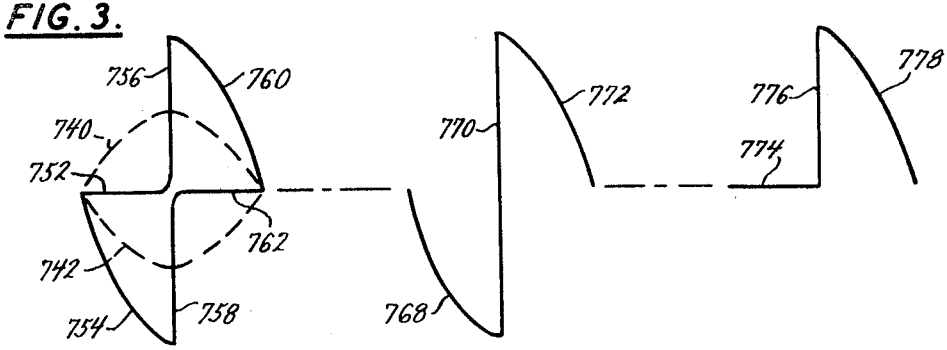
FIG. 3 shows waveforms which can develop across a magnetic amplifier's control winding and companion control winding, across that magnetic amplifier's secondary windings, and across the output terminals of the electric welder when the selectively-conductive element across those control windings is rendered conductive at the beginnings of the half-cycles developed across those control windings.

In the left-hand view of FIG. 3, the waveform 740 could be a positive-going half-wave voltage developed across any of the control windings 100, 120, 142 and 158; and the waveform 742 could be a negative-going half-wave voltage developed across any of those control windings. However, for the purposes of this description, it will be assumed that the waveform 740 is a half-wave voltage across control winding 100 when transistor 300 is non-conductive, and that the waveform 742 is a half-wave voltage which is simultaneously developed across control winding 120.

If it is assumed that transistor 300 is rendered conductive immediately after the start of a half-cycle wherein the voltage at the upper end of control winding 100 is positive, essentially short-circuit current will flow from that upper end via diode 316 and the collector-emitter circuit of transistor 300 to the lower end of that control winding to develop the essentially-zero waveform 752 in the left-hand view of FIG. 3. Also, the essentially-zero voltage at the collector of transistor 300—and hence at the cathode of diode 626 in FIG. 2B—will forward-bias that diode. The resulting low voltage at the anode of diode 622 will back-bias that diode; and hence tha voltage which will be applied to the inverting input of amplifier 630 must be supplied by amplifier 616 and diode 618 and by pin 9 of timer 578 and diode 632. That voltage will be less than the voltage which resistors 648 and 650 and adjustable resistor 652 apply to the non-inverting input of amplifier 630; and hence that amplifier will be induced by the conductive state of transistor 300 to keep that transistor conductive.

Because the voltage which the primary windings 92, 94, 96, 98, 112, 114, 116 and 118 tend to develop across the control windings 100 and 120 must appear across both or either of those control windings, the shunting of control winding 100 will cause the voltage across the control winding 120 to follow the waveform 754. The energy represented by that waveform is much greater than the energy represented by the waveform 742; and hence the core 108 will be negatively driven to saturation well prior to the end of the waveform 742—becoming saturated about ninety degrees after the start of that waveform. As the core 108 becomes saturated, the voltage across the control winding 120 will rapidly decrease to zero as indicated by the numeral 758 and the voltage across the control winding 100 will rapidly increase in the positive direction as indicated by the numeral 756.

The diode 316 will apply that increasing voltage to the collector-emitter circuit of transistor 300; and, when the voltage at the collector of that transistor—and hence at the cathode of diode 626 in FIG. 2B—reaches four volts, that diode will become back-biased. Thereupon, diode 622 will become forward-biased; and the resulting IR drop across resistor 620 will cause the voltage at the inverting input of amplifier 630 to rise above the voltage at the non-inverting input of that amplifier. The consequent negative output of that amplifier will render transistor 654 non-conductive, and transistors 658 and 300 also will become non-conductive. At that time, the control winding 100 will no longer be short-circuited; and hence the voltage across it will rise to a value considerably above the maximum value of the waveform 740. The core 108 will remain saturated throughout the rest of the half-cycle, and hence the voltage across control winding 120 will remain essentially-zero, as indicated by the numeral 762. The voltage across the control winding 100 will decrease along the waveform 760 and reach zero at the end of the half-cycle of the A.C.

At the time the large negative waveform 754 develops across control winding 120, a corresponding negative waveform develops across conductors 192 and 194, as indicated by the numeral 768 in the middle view of FIG. 3. Subsequently, as the voltage across control winding 120 goes to zero, as indicated by the numeral 758, and the voltage across control winding 100 goes positive, as indicated by the numeral 756, the voltage across conductors 192 and 194 will go to zero and then go positive, as indicated by the numeral 770. During the time the waveform 760 appears across control winding 100, the waveform 772 will appear across conductors 192 and 194. The diode 200 in FIG. 1 will block current flow while the negative waveform 768 appears across conductors 192 and 194; and hence the voltage across welding terminals 222 and 228 will be essentially zero, as indicated by the numeral 774 in the right-hand view of FIG. 3. However, as the voltage across conductors 192 and 194 goes positive, as indicated by the numeral 770, the voltage across those welding terminals will go positive, as indicated by the numeral 776. During the time the waveform 772 appears across conductors 192 and 194, the positive waveform 778 will appear across those welding terminals.

Waveforms, that are similar to the waveforms of FIG. 3, will be developed when the lower end of control winding 120 becomes positive and transistor 300 is rendered conductive at the beginning of the half-cycle in which that lower end becomes positive. However, the negative-going waveform similar to 754 will be developed across the control winding 100, and an essentially-zero voltage waveform like 752 will appear across control winding 120 to cause a negative-going waveform like 768 to appear across conductors 192 and 194 and to provide essentially-zero voltage like 774 across the welding terminals 222 and 228. The change of voltage across control winding 100, which will be like 758, and the change of voltage across control winding 120, which will be like 756, will cause a change of voltage across conductors 192 and 194 like 770 and a voltage rise across the welding terminals like 776. The positive waveform like 760 across control winding 120 and the essentially-zero waveform like 762 across control winding 100 will provide a positive waveform like 772 across conductors 192 and 194 and a positive waveform like 778 across the welding terminals. In similar manner, when the upper end of control winding 142 is positive and transistor 324 is rendered conductive at the beginning of the half-cycle in which that upper end is conductive, waveforms that are similar to those of FIG. 3 will be developed. Further, when the upper end of control winding 158 is positive and transistor 324 is rendered conductive at the beginning of the half-cycle in which that upper end is conductive, waveforms that are similar to those of FIG. 3 will be developed.

When transistor 324 is to be rendered conductive, the positive-going signal will be supplied by pin 5 of timer 578; and transistor 700 and amplifier 692 will render transistors 720 and 724 conductive to render transistor 324 conductive. The diode 688 in FIG. 2B will become back-biased by the rising voltage which will develop across transistor 324 as the core of the un-saturated control winding becomes saturated and causes the voltage across that un-saturated control winding to go to zero; and the resistor 686, diode 684 and resistor 682 will cause amplifier 692 to develop a negative voltage at its output which will render transistors 720, 724 and 324 non-conductive. Importantly, each voltage pulse that is developed across the welding terminals—when the upper end of each control winding 100, 120, 142, and 158 becomes positive and transistors 300 and 324 are rendered conductive—will be a positive pulse. The leading edges of those pulses will be displaced ninety degrees apart to provide two hundred and forty such pulses per second.

Figure 4:
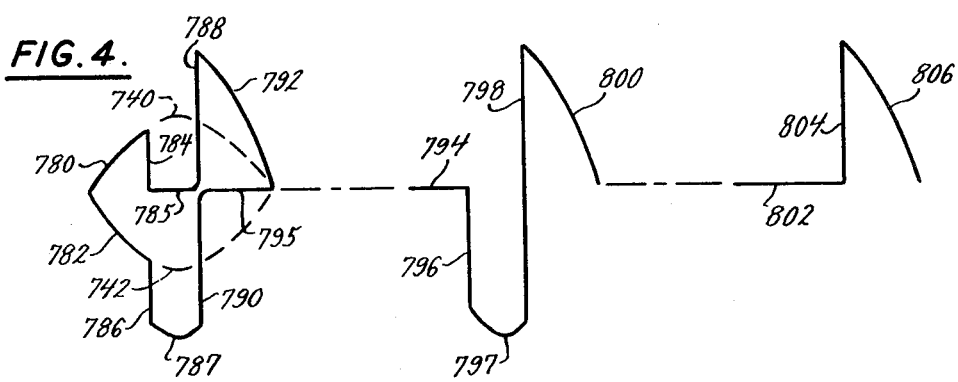
FIG. 4 shows three waveforms which can develop across the magnetic amplifier's control winding and companion control winding, across the output terminals of the electric welder when the selectively-conductive element across those control windings is rendered conductive shortly before the mid-points of the half-cycles developed across those control windings.

When the transistors 300 and 324 are not rendered conductive at the beginnings of half-cycles and, instead, are rendered conductive at later times during those half-cycles, each of the positive pulses which will be developed across the welding terminals 222 and 228 will be of shorter duration than the pulse 776, 778 of FIG. 3. For example, as shown by FIG. 4, when the transistors 300 and 324 are not rendered conductive at the beginnings of the half-cycles of the voltages across control windings 100, 120, 142 and 158, a positive-going waveform 780 will develop across one of those windings at the beginnings of those half-cycles while a negative-going waveform 782, which is a mirror image of waveform 780, will develop across the companion control winding. At such time, the voltages across the secondary windings 100 and 122 or across the secondary windings 144 and 160 will be equal and opposite; and hence the voltage across conductors 192 and 194 will be zero, as indicated by the numberal 794. The voltage across the welding terminals 222 and 228 also will be zero, as indicated by the numeral 802.

As the transistors 300 and 324 are rendered conductive, the voltage across the control winding, which has the positive voltage at the upper end thereof, will fall to zero as indicated by the numeral 784; and the voltage across the companion control winding will go even further negative, as indicated by the numeral 786—with consequent development of the negative-going waveform 796 across conductors 192 and 194. Diode 200 or 230 will be back-biased by that negative-going waveform, and hence the voltage across welding terminals 222 and 228 will continue to be zero, as indicated by the numeral 802. As long as the transistor 300 or 324 remains conductive, the control winding which has the positive voltage at the upper end thereof will continue to have zero voltage across it, as indicated by the numeral 785; and the companion control windings will have the negative waveform 787 developed across it—with consequent development of the negative waveform 797 across conductors 192 and 194. That negative waveform will continue to back-bias diode 200 or 230, and hence the voltage across terminals 222 and 228 will continue to be zero, as indicated by the numeral 802. However, when the appropriate negatively-driven core reaches saturation, causing transistor 300 or 324 to become non-conductive, the voltage across the control winding, which has a positive voltage at the upper end thereof, will abruptly go positive, as indicated by the numeral 788; and the voltage across the companion control winding will abruptly go to zero, as indicated by the numeral 790—with a consequent abrupt change of the voltage across conductors 192 and 198 from negative to positive, as indicated by the numeral 798, Diode 200 or 230 will respond to that positive-going voltage to provide the positive-going waveform 804. Throughout the rest of the half-cycle, the voltage across the control winding which has a positive voltage at the upper end thereof will follow the waveform 792, while the voltage across the companion control winding will be zero, as indicated by 793—with consequent development of the waveform 800 across conductors 192 and 194. Diode 200 or 230 will respond to that waveform to provide the waveform 806 across the welding terminals 222 and 228. This means that where transistor 300 or 324 is rendered conductive after the beginning of a half-cycle of the A.C. developed across one of the control windings 100, 120, 142 and 158, and that transistor is rendered non-conductive before the end of that half-cycle, a positive-going voltage pulse will develop across the terminals 222 and 228; but that pulse will have a duration of less than ninety degrees.

Figure 5:
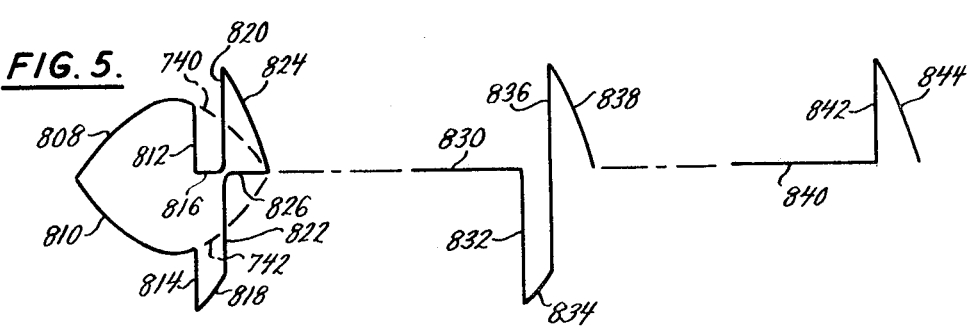
FIG. 5 is a view of three waveforms which can develop across the magnetic amplifier's control winding and companion control winding, across the magnetic amplifier's secondary windings, and across the output terminals of the electric welder when the selectively-conductive element across those control windings is not rendered conductive until the latter part of the half-cycles developed across those control windings.

FIG. 5 shows waveforms which will develop when transistor 300 or 324 is rendered conductive during the latter part of the half-cycles of the voltages across control windings 100, 120, 142 and 158. Prior to the time that transistor is rendered conductive, the waveforms across the appropriate ones of those control windings will be those denoted by the numerals 808 and 810; and the consequent zero voltage across conductors 192 and 194, which is indicated by the numeral 830, will cause zero voltage to appear across terminals 222 and 228, as indicated by the numeral 840. As transistor 300 or 324 becomes conductive, the voltage across one of those windings will drop to zero, as indicated by the numeral 812, while the voltage across the companion winding will become sharply negative, as indicated by the numeral 814—with consequent development of the negative-going waveform 832 across conductors 192 and 194. Because the diode 200 or 230 will be back-biased by that negative-going waveform, the voltage across the terminals 222 and 228 will continue to be zero as indicated by the numeral 840. Throughout the time the transistor 300 or 324 remains conductive, the voltage on the one control winding will remain at zero, as indicated by the numeral 816, while the voltage across the companion control winding will be negative, as indicated by the waveform 818—with a consequent negative waveform 834 across conductors 192 and 194. Because that negative waveform will continue to back-bias the diode 200 or 230, the voltage across terminals 222 and 228 will continue to be zero, as indicated by the numeral 840. At the instant the appropriate negatively-driven core reaches saturation and causes transistor 300 or 324 to become non-conductive, the voltage across the one control winding will abruptly become positive, as indicated by the numeral 820, while the voltage across the companion control winding will abruptly go to zero, as indicated by the numeral 822—with consequent development of the positive-going waveform 836 across conductors 192 and 194. Diode 200 or 230 will respond to the positive-going waveform 836 to provide the positive-going waveform 842 across terminals 222 and 228. Throughout the rest of the half-cycle, the voltage across the one control winding will follow the waveform 824, while the voltage across the companion control winding will be zero, as indicated by the numeral 826—with consequent provision of the waveform 838 across conductors 192 and 194. The resulting voltage across the terminals 222 and 228 will be that represented by the numeral 844. This means that when the transistor 300 or 324 is rendered conductive in the latter part of a half-cycle, a positive-going pulse will develop across the terminals 222 and 228; but that voltage pulse will have a duration which is considerably less than ninety degrees.

The half-waves which are developed across the control windings 142 and 158 are displaced ninety degrees from the half-waves which are developed across the control windings 100 and 120. The positive voltage pulses which control windings 142 and 158 cause the secondary windings 144 and 160 to develop across the terminals 222 and 228 will be interposed between the positive voltage pulses which control windings 100 and 120 cause the secondary windings 102 and 122 to develop across those terminals. As a result, positive pulses can be developed across those terminals at the rate of two hundred and forty per second.

The time which is required to saturate a control winding will be a function of the voltage that is developed across that control winding; and that voltage will vary throughout each half-cycle. Because the waveform 785 of FIG. 4 is in register with portions of waveform 740 that are spaced well above zero, whereas the waveform 752 of FIG. 3 is in register with some portions of waveform 740 that are close to zero, it will take less time for the control winding, which provides waveforms 782, 786, 787, 790 and 793, to become saturated than it will take for the control winding, which provides waveforms 754, 758 and 762, to become saturated. This means that the time during which transistor 300 or 324 was conductive to provide waveform 785 is shorter than the time during which that transistor was conductive to provide waveform 752. Because the waveform 816 of FIG. 5 is in register with portions of waveform 740 that are all spaced above zero, whereas the waveform 752 of FIG. 3 is in register with some portions of waveform 740 that are close to zero, it will take less time for the control winding, which provides waveforms 810, 814, 818, 822 and 826 to become saturated than it will take for the control winding, which provides waveforms 754, 758 and 762, to become saturated. However, because the waveform 816 is further from the midpoint of waveform 740 than is the waveform 785, it will take more time for the control winding, which provides waveforms 810, 814, 818, 822 and 826, to become saturated, than it will take for the control winding, which provides waveforms 782, 786, 787, 790 and 793, to become saturated. This means that the time during which transistor 300 or 324 was conductive to provide waveform 816 is shorter than the time during which that transistor was condictive to provide waveform 752 but is longer than the time during which that transistor was conductive to provide waveform 785. Also, it means that the positive pulse 788, 792, and hence the positive pulses 798, 800 and 804, 806, of FIG. 4 are shorter in duration and amplitude than the positive pulses 756, 760 and 770, 772 and 776, 778 of FIG. 3, and that the positive pulses 820, 824 and 836, 838 and 842, 844 of FIG. 5 are the shortest of the three groups of positive pulses. The waveforms of FIGS. 3–5 are merely illustrative of an infinite number of waveforms that can be produced by the electric welder of the present invention. Any number of waveforms can be provided, as long as transistor 300 or 324 is rendered conductive after the start of a half-cycle and is rendered non-conductive before the end of that half-cycle.

Whenever the transistor 300 is to be rendered conductive, it should be caused to conduct at the saturation level as quickly as practical; but, whenever that transistor is to be rendered non-conductive, the rate of rise of the voltage across the collector-emitter circuit thereof should be retarded. Similarly, whenever the transistor 324 is to be rendered conductive, it should be caused to conduct at the saturation level as quickly as practical; but, whenever that transistor is to be rendered non-conductive, the rate of rise of the voltage across the collector-emitter circuit thereof should be retarded.

During each time period when transistor 300 is non-conductive, capacitor 308 will charge up to a voltage which is close to the voltage across control winding 100 or 120; and, as that transistor subsequently is rendered conductive, that capacitor will discharge. If that capacitor was connected directly across that transistor, the charge therein would retard the rate at which the collector-emitter voltage could fall toward zero; and the current flow through the collector-emitter circuit, due to the charge in the capacitor, would cause undesired heating of that transistor. However, it will be noted that diode 312 is connected in series with that capacitor across that collector-emitter circuit and that resistor 310 is connected in series with that capacitor across that collector-emitter circuit. That diode will become backbiased as that transistor becomes conductive, and hence will not permit capacitor 308 to discharge through it and the collector-emitter circuit; and the resistor 310 will permit the collector-emitter voltage to promptly fall to zero even though that capacitor tends to maintain a voltage across its terminals. In this way, the transistor 300 is caused to conduct at the saturation level as quickly as practical. Similarly, the resistor 328, the capacitor 330 and the diode 332 respond to the rendering of transistor 324 conductive to cause that transistor to conduct at the saturation level as quickly as practical.

During the time when transistor 300 remains conductive, the charge across capacitor 308 will be dissipated in resistor 310 and in that transistor; but the current level in the collector-emitter circuit will be low enough to prevent appreciable heating of that transistor. Similarly, during the time when transistor 324 remains conductive, the charge across capacitor 330 will be dissipated in resistor 328 and in that transistor; but the current level in the collector-emitter circuit will be low enough to prevent appreciable heating of that transistor. As a result, at the ends of the conductive periods of transistors 300 and 324, the capacitors 308 and 330 will be discharged, and those transistors will not be unduly warm.

As transistor 300 is being rendered non-conductive, the voltage across its collector-emitter circuit will tend to rise at a rapid rate. However, diode 312 will be forward-biased and will coact with capacitor 308 to limit the rate of rise of the voltage across that collector-emitter circuit to the rate of rise of the voltage across that capacitor. Similarly, as transistor 324 is being rendered non-conductive, the voltage across its collector-emitter circuit will tend to rise at a rapid rate. However, diode 332 will be forward-biased and will coact with capacitor 330 to limit the rate of rise of the voltage across that collector-emitter circuit to the rate of rise of the voltage across that capacitor.

In this way each of transistors 300 and 324 is caused to conduct at the saturation level as soon as it starts to become conductive; and yet it is not appreciably heated by current flow due to the charge in capacitor 308 or 330, respectively. When that transistor is subsequently rendered non-conductive, the series-connected diode and capacitor across its collector-emitter circuit will retard the rate of rise of the voltage across that collector-emitter circuit.

Setting of Levels of Welding Current

The desired level of welding current or of welding voltage is selected by an appropriate setting of the control knob of thumbwheel switch 378, of the control knob of remotely-located thumbwheel switch 380, or of the control knobs of a programmer 84. A T11F-O2-A3 Thumbwheel Switch of Cherry Electronics is very usable as thumbwheel switch 378 or 380. An ESAB Model PAF16 Programmer, Stock No. 155125880 is very usable as programmer 384. The kind of feedback signal which is used to keep the actual welding current or welding voltage at the selected level will be determined by the setting of the movable contact 462 of switch 454—as explained hereinafter in the Feedback Circuits section. Also, the response of the electric welder to feedback signals will be described in that section rather than in this section. The electric welder can be used as a D.C. welder, as described in this section, or can be used as an A.C. welder, as described hereinafter in the Use As A.C. Welder section; and hence, in this section, it will be assumed that movable contacts 248 and 250 in FIG. 1 engage fixed contacts 240 and 242, respectively. The potentiometer 572 in FIG. 2A enables the electric welder to be set to provide symmetrical or asymmetrical A.C. pulses, as described hereinafter in the Symmetrical A.C. Pulses section; but in this section it will be assumed that the movable contact of that potentiometer engages the emitter of transistor 574.

The movable contact 392 in FIG. 6 will engage fixed contact 386 whenever the level of welding current or of welding voltage is to be selected by thumbwheel switch 378, will engage fixed contact 388 whenever the remotely-located thumbwheel switch 380 is to select that level, and will engage fixed contact 390 whenever the programmer 384 is to select that level. The thumbwheel switch 378 will act as a voltage divider between 12 volts regulated D.C. and signal ground; and, if the movable contact 392 is in engagement with fixed contact 386, the movable contact of that thumbwheel switch will tend to apply a positive voltage to the non-inverting input of operational amplifier 480 in FIG. 2A. However, if the welding torch is resting on an object, the contactor 394 will be closed and will shunt the middle contact of thumbwheel switch 378 to ground. The contactor 394 will be open whenever the operator of the electric welder is holding the welding torch; and hence, at such times, a positive voltage will be applied to the non-inverting input of operational amplifier 480. The resulting positive voltage at the output of that operational amplifier will be applied across resistors 546 and 544, across resistors 548 and 550, across resistor 552 and potentiometer 554 and across resistors 551 and 553 and capacitor 555. The effects of the voltage across resistors 546 and 544, across resistors 548 and 550 and across resistors 551 and 553 and capacitor 555 are discussed in the TIG Start Control Circuit section, in the MIG Start Control Circuit section, and in the Feedback Circuits section rather than in this section. The left-hand portion of potentiometer 554 coacts with resistor 560, potentiometer 558 and resistor 556 to constitute a voltage divider which is connected between signal ground and 12 volts regulated D.C.; and the voltage which operational amplifier 480 applies across resistor 552 and potentiometer 554 will increase the voltage which the movable contact of potentiometer 558 applies to the base of transistor 562. That increased voltage will reduce, but not halt, the conductivity of that transistor; and the resulting negative-going voltage at the base of transistor 574 will render that transistor more conductive. The resulting reduced voltage at the emitter of transistor 574 will reduce the values of the voltages at pins 3 and 11 of timer 578. It should be noted that whenever the value of a positive-going signal at pin 5 of that timer rises to the value of the voltage at pin 3, that timer will immediately and automatically reduce the voltage at pin 5 to zero; and that whenever the value of a positive-going signal at pin 9 of that time rises to the value of the voltage at pin 11, that timer will immediately and automatically reduce the voltage at pin 9 to zero. As a result, a reduced voltage at the emitter of transistor 574 will reduce the values which the positive-going signals at pins 5 and 9 must attain to cause that timer to immediately and automatically reduce the voltages at those pins to zero. The rate of growth of those positive-going signals is constant; and, consequently, the lower the values of the voltages at pins 3 and 11, the shorter the time during which the positive-going signals from pins 5 and 9 will cause diodes 714 and 632 to coact with amplifiers 692 and 630 to keep transistors 720, 724 and 324 and transistors 654, 658 and 300 non-conductive. When the thumbwheel switch 378 is set to select maximum current or voltage, the resulting high voltage at the output of operational amplifier 480 will substantially reduce, but not halt, the conductivity of transistor 562—with resulting high conductivity of transistor 574 and low voltages at pins 3 and 11 of timer 578. Those low voltages will enable that timer to reduce the voltages at pins 5 and 9 to zero at the beginnings of half-cycles of the A.C. developed in control windings 100 and 120 and in control windings 142 and 158—as indicated by FIG. 3, and hence maximum value output pulses 776, 778 will appear across the welding terminals 222 and 228.

If the knob of thumbwheel switch 378 in FIG. 6 is set to cause that thumbwheel switch to supply a lower voltage to the non-inverting input of operational amplifier 480 in FIG. 2A, the resulting lower voltage at the base of transistor 562 will render that transistor more conductive to increase the IR drop across resistor 568. Transistor 574 will become less conductive and thereby increase the values of the voltages at pins 3 and 11. The positive-going signals at pins 5 and 9 will take longer to reach those higher values of voltage at pins 3 and 11; and hence the transistors 300 and 324 will not be rendered conductive until an appreciable time after the beginnings of the half-cycles developed in control windings 100 and 120 and in control windings 142 and 158—as indicated by FIG. 4. The resulting pulses 804, 806 across the welding terminals 222 and 228 will provide a lower level of welding current or welding voltage.

If the knob of thumbwheel switch 378 in FIG. 6 is set to cause that thumbwheel switch to supply an even lower voltage to the non-inverting input of operational amplifier 480 in FIG. 2A, the resulting still lower voltage at the base of transistor 562 will render that transistor even more conductive to additionally increase the IR drop across resistor 568. Transistor 574 will then become even less conductive and thereby further increase the values of the voltages at pins 3 and 11. The positive-going signals at pins 5 and 9 will take even longer to reach those stil higher values of voltage at pins 3 and 11; and hence the transistors 300 and 324 will not be rendered conductive until the later parts of the half-cycles developed in control windings 100 and 120 and in control windings 142 and 158—as indicated by FIG. 5. The resulting pulses 842, 844 across the welding terminals 222 and 228 will provide an even lower level of welding current or welding voltage.

The thumbwheel switch 378 has marks and numerals adjacent the knob thereof to guide the operator in selecting the desired values of welding current or of welding voltage. Similarly, the thumbwheel switch 380 and the programmer 384 have marks and numerals adjacent the knobs thereof to guide the operator in selecting the desired values of welding current or of welding voltage. A welding current of one hundred amperes will correspond to a welding voltage of ten volts, a welding current of two hundred amperes will correspond to a welding voltage of twenty volts, a welding current of three hundred amperes will correspond to a welding voltage of thirty volts, and a welding current of any other level will correspond to a welding voltage of one-tenth of that level. As a result, it is only necessary to have the marks adjacent the knob of thumbwheel switch 378, or of thumbwheel switch 380 or of programmer 384, indicate current levels or voltage levels; and, in the preferred embodiments of the present invention, the markings denote current levels. A suitable notation on the electric welder, and a similar notation in the operating instructions, alert the operator to the simple and direct way of converting current levels to voltage levels. If desired, of course, voltage levels rather than current levels could be used, or voltage levels as well as current levels could be used. However, the use of current levels is quite satisfactory.

The marks and numerals adjacent the knob of thumbwheel switch 378 indicate a current range from one to three hundred and seventy-five amperes. When the movable contact 462 in FIG. 2A is set in engagement with the fixed contact 456, the thumbwheel switch 378 will, at one end of the range of settings of the knob thereof, cause the electric welder to establish and maintain a welding current level as low as one ampere. That thumbwheel switch will, at the other end of the range of settings of the knob thereof, cause that electric welder to establish and maintain a welding current level of three hundred and seventy-five amperes. When the movable contact 462 in FIG. 2A is set in engagement with the fixed contact 460, the thumbwheel switch 378 will, at that one end of the range of settings of the knob thereof, cause the electric welder to establish and maintain a welding voltage of as low as one-tenth of a volt. That thumbwheel switch will, at the other end of the range of settings of the knob thereof, cause the electric welder to establish and maintain a welding voltage of thirty-seven and one-half volts.

It will be noted that the voltage across terminals 222 and 228 will, prior to the initiation of an arc, tend to rise above the level of the desired level of welding voltage. This is due to the fact that the thumbwheel switch 378 or 380 or the programmer 384 will be calling for a desired output across those terminals, and the voltage feedback circuit will be indicating that the desired output is not being provided across those terminals; and hence operational amplifier 480 and transistors 562 and 574 will be supplying voltages to timer 578 which will cause large voltage pulses to appear across those terminals. As soon as an arc is struck and the voltage feedback circuit establishes the required control over the voltage across terminals 222 and 228, the voltage which is selected by the setting of thumbwheel switch 378 or 380 or of programmer 384 will be the voltage that is maintained across those terminals.

When the operator of the electric welder wishes to use the remotely-located thumbhweel switch 380 to set the desired levels of welding current or voltage, the movable contact 392 in FIG. 6 will be placed in engagement with fixed contact 388. At such time, that thumbwheel switch will respond to the voltage at the movable contact of thumbwheel switch 378 to apply the same, or a lesser, voltage to the non-inverting input of operational amplifier 480 in FIG. 2A. It should be noted that the thumb-wheel switch 380 cannot—regardless of the setting of the knob thereof—apply a voltage to that non-inverting input which is larger than the voltage at the movable contact of thumbwheel switch 378.

The response of the electric welder to voltages which are set at the movable contact of thumbwheel switch 380, when movable contact 392 engages fixed contact 388, will be similar to the rsponse which that electric welder provides to the same voltages at the movable contact of thumbwheel switch 378 when that movable contact engages fixed contact 386. Thus, the higher the voltage at the movable contact of thumbwheel switch 380, the larger the welding pulses across terminals 222 and 228; and the lower the voltage at the movable contact of that thumbwheel switch, the smaller the welding pulses across those terminals.

The remotely-located thumbwheel switch 380 can be connected to, or disconnected from, the electric welder by a plug and socket, not shown. Whenever that thumbwheel switch is connected to the electric welder by that plug and socket, that thumbwheel switch will be connected between signal ground and the movable contact of thumbwheel switch 378. At such time, any voltage at the movable contact of thumbwheel switch 378 will cause a voltage to appear at the movable contact of thumbwheel switch 380.

When the operator of the electric welder wishes to use the programmer 384 to set the desired level of welding current or welding voltage, the movable contact 392 in FIG. 6 will be placed in engagement with fixed contact 390. At such time, the programmer can be set to apply any desired voltage to the non-inverting input of operational amplifier 480 in FIG. 2A. The response of the electric welder to voltages which are supplied by programmer 384, when movable contact 392 engages fixed contact 390, will be similar to the response which that electric welder provides to the same voltages at the movable contact of thumbwheel switch 378 when that movable contact engages fixed contact 386. Thus, the higher the voltage supplied by that programmer, the larger the welding pulses across terminals 222 and 228; and the lower the voltage supplied by that programmer, the smaller the welding pulses across those terminals.

All of the voltages which are supplied by thumbwheel switch 378, by remotely-located thumbwheel switch 380, and by programmer 384 are small voltages. Thus, when either of those thumbwheel switches or that programmer is set to call for 100 amperes supplied to, or 10 volts across, terminals 222 and 228, the voltage at terminal 396 in FIG. 6 will be only one-half of a volt; and when either of those thumbwheel switches or that programmer is set to call for 200 amperes supplied to, or 20 volts across, terminals 222 and 228, the voltage at terminal 396 in FIG. 6 will be only one volt. When either of those thumbwheel switches or that programmer is set to call for 300 amperes supplied to, or 30 volts across, terminals 222 and 228, the voltage at terminal 396 in FIG. 6 will be only one and one-half volts; and correspondingly low voltages will appear at terminal 396 when various other voltages are called for by either of those thumbwheel switches or that programmer. The ability of the electric welder to respond to such low voltages from thumbwheel switch 378 or thumbwheel switch 380 or programmer 384 frees the operator of that electric welder from all risk of electric shock while he is adjusting the knobs of either of those thumbwheel switches or of that programmer. Also, the high input impedance of the non-inverting input of amplifier 480 makes it possible to use small cross section, readily-flexible, inexpensive conductors to connect thumbwheel switch 380 to thumbwheel switch 378.

Feedback Circuits

A current feedback circuit includes operational amplifiers 418, 412, 432, 436 and 466; and it can respond to current feedback signals at terminals 218 and 414 to apply a positive voltage to the inverting input of operational amplifier 480. The operational amplifiers 418 and 412 coact to apply a positive current feedback signal to the non-inverting input of operational amplifier 436—whether the current feedback signal at terminals 218 and 414 is positive-going or negative-going. The operational amplifier 436 acts as a buffer amplifier. The operational amplifier 432 will respond to change in the output of operational amplifier 480, which is due to a change in the setting of thumbwheel switch 378 or 380 or of programmer 384 and which is applied across resistors 551 and 553 and capacitor 555, to provide an output which is proportional to the changing output of operational amplifier 480. Capacitor 435 will couple that proportional output to the non-inverting input of operational amplifier 436—with consequent development of corresponding changes in the outputs of that operational amplifier and of operational amplifier 466. For example, if it is assumed that the voltage at the output of operational amplifier 480 tended to increase in response to a change of setting of thumbwheel switch 378 or 380 or of programmer 384, that increased voltage would be applied across resistors 551 and 553 and capacitor 555. A smaller, but proportional, increase in voltage at the junction between resistors 551 and 553 would cause operational amplifier 432 and capacitor 435 to apply a positive-going signal to the non-inverting input of operational amplifier 436—with consequent application of a corresponding positive-going signal to the non-inverting input of operational amplifier 466. The resulting positive-going signal at the output of the latter operational amplifier would be applied to the inverting input of operational amplifier 480, and would promptly cause operational amplifier 480 to limit the extent to which the voltage at its output could increase. Conversely, it it is assumed that the voltage at the output of operational amplifier 480 tended to decrease in response to a change of setting of thumbwheel switch 378 or 380 or of programmer 384, that decreased voltage would be applied across resistors 551 and 553 and capacitor 555. A smaller, but proportional, decrease in voltage at the junction between resistors 551 and 553 would cause operational amplifier 432 and capacitor 435 to apply a negative-going signal to the non-inverting input of operational amplifier 436—with consequent application of a corresponding negative-going signal to the non-inverting input of operational amplifier 466. The resulting negative-going signal at the output of the latter operational amplifier would be applied to the inverting input of operational amplifier 480, and would promptly cause operational amplifier 480 to limit the extent to which the voltage at its output could decrease.

Resistors 551 and 553 and capacitor 555, and operational amplifiers 432, 436 and 466 provide a simulated current feedback response which will limit the extent to which immediate changes can develop in the output of operational amplifier 480 as the operator of the electric welder makes changes in the setting of thumbwheel switch 378 or 380 or of programmer 384. As soon as the magnetic amplifiers respond to that change in setting to start changing the magnitudes of the voltage pulses which are supplied to the welding terminals 222 and 228, the current transformers 204 and 208 will start to change the level of the current feedback signal which they supply, via terminals 218 and 414, operational amplifiers 418, 412, 436 and 466 to the inverting input of operational amplifier 480. The current feedback signal will then cause the voltage at the output terminal of operational amplifier 480 to continue to change until it reaches the value which is needed to provide and maintain the level of current set by thumbwheel switch 378 or 380 or by programmer 384. The simulated current feedback response from operational resistors 551 and 553 and capacitor 555 and operational amplifiers 432, 436 and 466 is needed to prevent an abrupt change in the current level which could develop because of the time delays which are inherent in the operations of magnetic amplifiers.

A voltage feedback circuit includes operational amplifiers 492, 500, 510, 516 and 466; and it can respond to voltage feedback signals at terminals 224 and 484 to apply a positive voltage to the inverting input of operational amplifier 480. The operational amplifiers 492 and 500 coact to apply a positive voltage feedback signal to the non-inverting input of operational amplifier 516—whether the voltage feedback signal at terminals 224 and 484 is positive-going or negative-going. The operational amplifier 516 acts as a buffer amplifier. The operational amplifier 510 will respond to any change in the output of operational amplifier 480 which is due to a change in the setting of thumbwheel switch 378 or 380 or of programmer 384 and which is applied across resistors 551 and 553 and capacitor 555, to provide an output which is proportional to the changing output of operational amplifier 480. Capacitor 512 will couple that proportional output to the non-inverting input of operational amplifier 516—with consequent development of corresponding changes in the outputs of that operational amplifier and of operational amplifier 466. For example, if it is assumed that the voltage at the output of operational amplifier 480 tended to increase in a response to a change of setting of thumbwheel switch 378 or 380 or of programmer 384, that increased voltage would be applied across resistors 551 and 553 and capacitor 555. A smaller, but proportional increase in voltage at the junction between resistors 551 and 553 would cause operational amplifier 510 and capacitor 512 to apply a positive-going signal to the non-inverting input of operational amplifier 516—with consequent application of a corresponding positive-going signal to the non-inverting input of operational amplifier 466. The resulting positive-going signal at the output of the latter operational amplifier would be applied to the inverting input of operational amplifier 480, and would promptly cause operational amplifier 480 to limit the extent to which the voltage of its output could increase. Conversely, if it is assumed that the voltage at the output of operational amplifier 480 tended to decrease in response to a change of setting of thumbwheel switch 378 or 380 or of programmer 384, that decreased voltage would be applied across resistors 551 and 553 and capacitor 555. A smaller, but proportional decrease in voltage at the junction between resistors 551 and 553 would cause operational amplifier 510 and capacitor 512 to apply a negative-going signal to the non-inverting input of operational amplifier 516—with consequent application of a corresponding negative-going signal to the non-inverting input of operational amplifier 466. The resulting negative-going signal at the output of the latter operational amplifier would be applied to the inverting input of operational amplifier 480 and promptly cause operational amplifier 480 to limit the extent to which the voltage at its output could decrease.

Resistors 551 and 553 and capacitor 555 and operational amplifiers 510, 516 and 466 provide a simulated voltage feedback response which will limit the extent to which immediate changes can develop in the output of operational amplifier 480 as the operator of the electric welder makes changes in the setting of thumbwheel switch 378 or 380 or of programmer 384. As soon as the magnetic amplifiers respond to that change in setting to start changing the magnitudes of the voltage pulses supplied to the welding terminals 222 and 228, the terminals 224 and 484 will, via operational amplifiers 492, 500, 516 and 466, apply a voltage feedback signal to the inverting input of operational amplifier 480. That voltage feedback signal will then cause the voltage at the output terminal of operational amplifier 480 to continue to change until it reaches the value which is needed to provide and maintain the level of voltage set by thumbwheel switch 378 or 380 or by programmer 384. The simulated voltage feedback response from resistors 551 and 553 and capacitor 555 and operational amplifiers 510, 516 and 466 is needed to prevent an abrupt change in the voltage level which could develop because of the time delays which are inherent in the operations of magnetic amplifiers.

All of this means that once a desired level of welding current or of welding voltage has been selected by an appropriate setting of the knob of thumbwheel switch 378 or 380 or of programmer 384, the appropriate feedback circuit will automatically provide a momentary simulated feedback signal to prevent an abrupt change in the values of the welding pulses applied to terminals 222 and 228. Thereafter that feedback circuit will respond to an appropriate feedback signal to maintain the desired values for those welding pulses. The current feedback circuit is active whenever movable contact 462 is set in engagement with fixed contact 456 of switch 454. The voltage feedback circuit is active whenever that movable contact is set in engagement with fixed contact 460 of that switch.

Whenever movable contact 462 is set in engagement with fixed contact 458 and the movable contact of potentiometer 532 is displaced from both the upper and lower terminals of that potentiometer, both the current feedback circuit and the voltage feedback circuit will participate in the control of the output which is developed by operational amplifier 480. Because a change in actual welding current is usually accompanied by an inverse change in welding voltage, and because a change in actual welding voltage is usually accompanied by an inverse change in actual welding current, an appreciable voltage differential will develop across potentiometer 532 in response to any change in actual welding current or in response to any change in actual welding voltage. For example, if it is assumed that the actual welding current increases—and thereby causes a positive-going voltage to develop at the output of operational amplifier 436, and hence at the upper terminal of potentiometer 532—a decrease will occur in the actual welding voltage which will cause a negative-going voltage to develop at the output of operational amplifier 516, and hence at the lower input of potentiometer 532. The movable contact of that potentiometer will respond to the resulting voltage differential across that potentiometer to cause operational amplifier 466 to apply a signal to the inverting input of operational amplifier 480. If the movable contact of potentiometer 532 is closer to the upper terminal of that potentiometer than it is to the lower terminal of that potentiometer, the voltage at the inverting input of operational amplifier 480 will follow the voltage at the output of operational amplifier 436 more closely than it will follow the voltage at the output of operational amplifier k516. On the other hand, if the movable contact of potentiometer 532 is closer to the lower terminal of that potentiometer than it is to the upper terminal of that potentiometer, the voltage at the inverting input of operational amplifier 480 will follow the voltage at the output of operational amplifier 516 more closely than it will follow the voltage at the output of operational amplifier 436. By appropriate setting of the movable contact of potentiometer 532, the slope of the voltage-current curve can be set parallel to the voltage ordinate, parallel to the current ordinate, or at any desired angle relative to those ordinates.

It is important to note that although the durations of the conductive periods of transistors 300 and 324 are determined by the amounts of time which the unshunted control windings require to saturate the cores on which they are wound, the durations of the conductive periods of transistors 300 and 324 must be variable in response to current feedback signals, voltage feedback signals or to slope feedback signals. The present invention makes this possible by (a) using the output of operational amplifier 480 to determine the voltages at pins 3 and 11 of timer 578, and thereby determine how quickly transistors 300 and 324 are rendered conductive after the beginnings of the half-cycles in which they are to be rendered conductive—and hence how long the resulting welding pulses will be, as shown by FIGS. 3–5, and (b) using current feedback, voltage feedback or slope feedback signals to modify the output of operational amplifier 480. As a result, the thumbwheel switch 378 or 380 of the programmer 384 can be used to set an output level for operational amplifier 480 which will determine how quickly transistors 320 and 324 should become conductive after the beginnings of the half-cycles in which they are to be rendered conductive, and thence determine the desired values for the welding pulses; and the current feedback current, the voltage feedback circuit or the slope feedback circuit can modify the output level of that operational amplifier to vary the turn-on times of those transistors, and thereby enable the actual welding current or welding voltage to equal the desired welding current or welding voltage.

TIG Control Circuit

When the operator of the electric welder wishes to perform tungsten insert gas welding operations, he will set the knob of potentiometer 402 of FIG. 2A to a desired level; and he will either set the movable contact 462 of switch 454 in engagement with fixed contact 456 or will set that movable contact in engagement with fixed contact 458 and move the knob of potentiometer 532 closer to its constant-current setting than to its constant-voltage setting. If, as will usually be the same, the operator wishes to limit the initial current surge, that can develop as an arc is struck, to a level which is lower than that set by thumbwheel switch 378 or 380 or by programmer, 384, the movable contact of potentiometer 402 will be set to apply a voltage to the inverting input of operational amplifier 406 which will enable that operational amplifier to forward-bias diode 410, and thereby apply a positive voltage to the non-inverting input of operational amplifier 412. The resulting positive output of the latter operational amplifier will cause operational amplifiers 436 and 466 to apply a positive voltage to the inverting input of operational amplifier 480—with a consequent holding of the output of the latter operational amplifier to a level which will keep a large current surge from being applied to the welding terminals 222 and 228 at the instant an arc is struck. As a result, the operator will be able to initiate an arc without adverse and undesirable effects on the workpiece.

After the arc has been initiated, the current transformers 204 and 208 will respond to the current, flowing through that arc, to develop a current feedback signal at terminals 218 and 414. The current feedback circuit will quickly respond to that signal to establish a stable charge on capacitor 435; and, thereafter, that feedback circuit will tend to maintain the level of current through the arc at the level which is selected by thumbwheel switch 378 or 380 or by programmer 384. If, as will usually be the case, the level of current selected by potentiometer 402 is lower than the level which is selected by thumbwheel switch 378 or 380 or by programmer 384, the voltage from operational amplifier 406 will initially forward-bias diode 410 but the voltage which operational amplifier 418 applies to the non-inverting input of operational amplifier 412 and to the cathode of that diode will, after capacitor 435 has been charged to a stable state, be large enough to back-bias that diode. In such instances, that potentiometer and operational amplifier 406 will forwardly bias diode 410—and thereby reduce the voltage at the output of operational amplifier 480—only during the initiations of arcs.

If it ever became desirable for the operator to use a large surge of current to initiate an arc, the knob of potentiometer 402 could be set to reduce the voltage at the inverting input of operational amplifier 406 to a level at which the output of that operational amplifier did not forward-bias diode 410. In that event, essentially-zero voltage would appear at the non-inverting inputs of operational amplifiers 412, 436 and 466 and at the inverting input of operational amplifier 480. Consequently, the latter operational amplifier would develop a voltage at its output which would correspond to the current level that was selected by the thumbwheel switch 378 or 380 or by programmer 384. The electric welder would then supply the high surge of current which the operator desired.

It thus should be apparent that the operator of the electric welder can limit the amount of current which is available to initiate an arc or can supply maximum current to initiate an arc. All that need be done is to select an appropriate setting for the knob of potentiometer 402.

MIG Control Circuit

When the operator of the electric welder wishes to perform metal inert gas welding operations, he will set the knob of potentiometer 536 in FIG. 2A to a desired level; and he will either set the movable contact 462 of switch 454 in engagement with fixed contact 460 or will set that movable contact in engagement with fixed contacts 468 and move the knob of potentiometer 532 closer to its constant-voltage setting than to its constant-current setting. If, as will usually be the case, the operator wishes to keep the voltage across terminals 222 and 228 from dropping excessively as an arc is struck, the movable contact of porentiometers 536 should be set to apply a voltage to the inverting input of operational amplifier 540 which will enable that operational amplifier to forward-bias diode 498. The resulting essentially-zero voltage at the non-inverting input of operational amplifier 500—and hence at the non-inverting inputs of operational amplifiers 516 and 466—will cause essentially-zero voltage to be applied to the inverting input of operational amplifier 480. The consequent application, by the latter operational amplifier, of a relatively-large voltage to the base of transistor 562 will cause transistor 574 to apply a relatively-low voltage to pins 3 and 11 of timer 578—with resulting development of large voltage pulses across welding terminals 222 and 228. Those large voltage pulses will facilitate rapid charging of capacitor 512 to a stable state.

After a voltage feedback signal develops at terminal 224, the voltage feedback circuit will tend to increase the voltage at the non-inverting input of operational amplifier 480, and also to maintain a stable charge on capacitor 512. Thereupon, the voltage across the welding terminals 222 and 228 will remain essentially-constant at a level corresponding to the setting on thumbwheel switch 378 or 380 or on programmer 384. The initial higher voltage, which potentiometer 536, operational amplifier 540 and diode 498 enable operational amplifiers 500, 516, 466 and 480 to supply to the base of transistor 562, is desirable because it provides a prompt charging of capacitor 512 to a stable state and thereby keeps the voltage across terminals 222 and 228 from drooping excessively as an arc is struck.

After the voltage feedback circuit has established an equilibrium which will maintain the desired voltage level across welding terminals 222 and 2228, the operational amplifier 492 will apply a voltage to the anode of diode 498 which will back-bias that diode. As a result, the potentiometer 536, operational amplifier 540 and diode 498 will usually affect the output of operational amplifier 480 only during the initiations of arcs.

If an operator were to desire, or was willing to accept, a drooping voltage at the instant an arc was initiated, the potentiometer 536 could be set to cause operational amplifier 540 to apply a voltage to the cathode of diode 498 which would back-bias that diode. In such event, the voltage at the non-inverting input of operational amplifier 500—and hence at the non-inverting inputs of operational amplifiers 516 and 466—would cause those operational amplifiers to apply a voltage to the inverting input of operational amplifier 480 which would reduce the value of the voltage pulses applied to terminals 222 and 228. After an arc had been initiated, the voltage feedback signal would enable the voltage feedback circuit to charge capacitor 512 to a stable state, and thereby enable that feedback circuit to cause operational amplifier 480 to supply a voltage to the base of transistor 562 which would produce voltage pulses corresponding to the setting of thumbwheel switch 378 or 389 or of programmer 384. However, there would be an appreciable drooping of the voltage across terminals 222 and 228 until that capacitor was charged to a stable state.

It thus should be apparent that the operator of the electric welder can limit the extent to which the voltage across terminals 222 and 228 is permitted to droop. All that need be done is to select an appropriate setting for the knob of potentiometer 536.

Use As Pulse Welder

Whenever it is desirable to operate the electric welder as a pulse welder, the movable contacts 248 and 250 of switch 234 in FIG. 1 will be set in their D.C. positions wherein they engage fixed contacts 240 and 242, respectively. Also, the thermal circuit breaker 252 should be closed to supply "keep alive" voltage for the arc. In addition, the knob of potentiometer 572 in FIG. 2A will be set to displace the movable contact of that potentiometer from the emitter of transistor 574. At such time, that emitter will supply to pin 3 of timer 578 a voltage which is supplied by operational amplifier 480, which is selected by the setting of thumbwheel switch 378 or 380 or by programmer 384, and which is maintained by the appropriate feedback circuit or circuits. The lower section of that timer will cause one hundred and twenty pulses per second to be supplied to the welding terminals 222 and 228. If, at such time, the movable contact of potentiometer 572 is intermediate the ends of that potentiometer, that movable contact will supply to pin 11 of that timer a voltage which is a function of the voltage at the emitter of transistor 562 as well as of the voltage at the emitter of transistor 574 and, importantly, which is higher than the voltage at the latter emitter. Pin 11 will respond to that higher voltage to enable the upper section of timer 578 to cause a further one hundred and twenty pulses per second to be supplied to the welding terminals 222 and 228; but those pulses will be substantially smaller than the pulses due to the lower section of that timer. If the movable contact of potentiometer 572 is set at its upper limit, the voltage which will be applied to pin 11 will be so high that the positive-going signals at pin 9 wil not reach that voltage early enough in the half-cycles across control windings 100 and 124 to enable transistor 300 to become conductive and then non-conductive prior to the ends of those half-cycles.

This means that the movable contact of potentiometer 572 can be set to enable the electric welder to supply to the welding terminals 222 and 228 one hundred and twenty pulses per second of a given magnitude and an intervening one hundred and twenty pulses per second of a lesser magnitude. Also, it means that when that movable contact is set at its upper limit, the intervening pulses will not develop, and just the one hundred and twenty pulses per second which are due to the lower section of timer 578 will appear across welding terminals 222 and 228.

Keep Alive Circuit

The voltage, which is developed across the secondary windings 104 and 124 in FIG. 1, is not only applied to bridge rectifier 256 but also is applied to the bridge rectifier which is constituted by diodes 268 and 270 and by the left-hand diodes of bridge rectifier 256. That voltage will cause direct current to flow via junctions 272, 274 and 276, resistor 254, thermal circuit breaker 252, fixed contacts 246 and 240, movable contact 248, the primary windings of current transformers 204 and 208, swinging choke 220, welding terminal 222, the welding torch and workpiece, welding terminal 228, and signal ground to the anodes of the left-hand diodes of bridge rectifier 256 at the rate of hundred and twenty current pulses per second. Similarly the voltage, which is developed across the secondary windings 146 and 162, is not only applied to bridge rectifier 278 but also is applied to the bridge rectifier which is constituted by diodes 286 and 288 and by the left-hand diodes of bridge rectifier 278. That voltage will cause direct current to flow via junctions 274 and 276, resistor 254, thermal circuit breaker 252, fixed contacts 246 and 240, movable contact 248, the primary windings of current transformers 204 and 208, swinging choke 220, welding terminal 222, the welding torch and workpiece, welding terminal 228, and signal ground to the anodes of the left-hand diodes of bridge rectifier 278 at the rate of one hundred and twenty current pulses per second. Because the current pulses developed by secondary windings 146 and 162 will be displaced ninety degrees from the current pulses developed by secondary windings 104 and 124, the keep alive circuit will supply direct current pulses to the arc at the rate of two hundred and forty pulses per second—and those pulses will keep the arc alive in the periods of time between the pulses which are provided by the secondary windings 144 and 160, even if the potentiometer 572 is set to keep the secondary windings 102 and 122 from developing effective pulses.

Transistor Protecting Circuit

When the transistor 300 is rendered non-conductive, the inductive energy within control winding 100 or 120 will tend to develop a sharp voltage spike across that transistor which could be injurious to that transistor. Similarly, when the transistor 324 is rendered non-conductive, the inductive energy within control winding 142 or 158 will tend to develop a sharp voltage spike across that transistor which could be injurious to that transistor. However, the transistor protecting circuit of the present invention will prevent the development of such voltage spikes, and will thereby protect the transistors 300 and 324.

In that protecting circuit, the diodes 316 and 314 and the RC network, consisting of resistor 304 and capacitor 306, are connected in series across control winding 100, and the diodes 318 and 314 and that RC network are connected in series across control winding 120. Similarly, the diodes 336 and 334 and that RC network are connected in series across control winding 142, and the diodes 338 and 334 and that RC network are connected in series across control winding 158. That RC network will act to dissipate excess conductive energy from those control windings when transistor 300 or transistor 324 becomes non-conductive. In this way, the amplitudes of any voltage spikes which may develop as those transistors are rendered non-conductive will be kept below potentially-injurious levels.

Use As A.C. Welder

When the electric welder is to be used as an A.C. welder, the movable contacts 248 and 250 of switch 234 will be set in engagement with fixed contacts 244 and 246, respectively. Instead of having both diodes 200 and 230 supplying voltage pulses directly to welding terminal 222—as was the case when those movable contacts engaged fixed contacts 240 and 242, respectively—diode 230 will supply voltage pulses directly to welding terminal 228. As a result, secondary windings 102 and 122 will coact to supply positive-going pulses to the arc and secondary windings 144 and 160 will coact to supply negative-going pulses to that arc.

The desired level of welding current or of welding voltage will be set by thumbwheel switch 378 or 380 or by programmer 384; and the markings and numerals adjacent the knobs of those thumbwheel switches or of that programmer are just as valid for A.C. operation as they are for D.C. operation. The current transformers 204 and 208 will coact with secondary winding 210 and resistor 216 to apply a current feedback signal to terminal 218; and the current feedback circuit can respond to that feedback signal to hold the welding current at the desired level. A voltage feedback signal will develop at terminal 224; and the voltage feedback circuit can respond to that feedback signal to hold the welding voltage at the desired level. The operation of those feedback circuits will be the same as described hereinbefore in the Feedback Circuits section.

It is desirable to be able to provide two different welding current ranges when the electric welder is used as an A.C. welder; and the swinging choke 220 of FIG. 1 makes it possible to provide such ranges. When the welding leads are connected to welding terminals 226 and 228, the electric welder can supply welding current in the range from five amperes to three hundred and seventy-five amperes. When those leads are connected to welding terminals 222 and 228, the electric welder can supply welding current in the range from zero to five amperes. The swinging choke 220 will be in the welding circuit whenever the welding leads are connected to welding terminals 222 and 228; and the continuous laminations in the core of that choke will provide a high inductance to low values of A.C. but will saturate on higher values of A.C. In this way, that choke effectively enables the electric welder to provide A.C. current in the range of zero to five amperes whenever the welding leads are connected to welding terminals 222 and 228.

It should be noted that although one of the welding leads is shifted between welding terminals 222 and 226 as the A.C. current range is changed, the thumbwheel switch 378 or 380 is able to provide output voltages which will enable the electric welder to provide the full range of current from zero to three hundred and seventy-five amperes. Similarly, when the electric welder is used as a D.C. welder, the thumbwheel switch 378 or 380 is able to provide output voltages which enable that electric welder to provide the full range of current from zero to three hundred and seventy-five amperes. This is in contrast to some prior electric welders which required several controls to be actuated at different times to provide a current range of three hundred amperes.

Swinging Choke

During each pulse which is supplied to the arc, inductive energy will be stored in the swinging choke 220. As that pulse disappears, the inductive energy in that choke will cause welding current to continue to flow through that arc. When the electric welder is used as a D.C. welder, the inductive energy in the swinging choke 220 will tend to cause the voltage across welding terminals 222 and 228 to go negative between the succeeding positive pulses; and such a result would not be desirable. The present invention keeps inductive energy in that swinging choke from causing the voltage, across welding terminals 222 and 228, to go negative by providing the diode 232; so current will flow from the right-hand end of that swinging choke via welding terminal 222, the welding torch and workpiece, welding terminal 228, conductor 317, diode 232, fixed contact 240, movable contact 248, and the primary windings of current transformers 204 and 208 to the left-hand end of that choke. That current flow will dissipate the inductive energy from the swinging choke, and thereby keep the voltage across welding terminals 222 and 228 from going negative. In addition, the swinging choke 220 will tend to smooth out the positive pulses that are supplied to the welding terminals 222 and 228.

Symmetrical A.C. Pulses

When an electric welder supplies A.C. to an arc, that arc tends to provide at least partial rectification of that A.C. In some welding operations, that rectification is not objectionable; but, in other welding operations, that rectification can be very undesirable. The present invention makes it possible for the output of the electric welder to approach true A.C. rather than to be mere rectified A.C.

When the movable contact of potentiometer 572 in FIG. 2A is displaced from the emitter of transistor 574, that movable contact will apply a voltage to pin 11 of timer 578 which is larger than the voltage which the emitter of that transistor can apply to pin 3 of that timer. The larger voltage at pin 11 will require the positive-going voltages at pin 9 to reach higher values, and hence will require those voltages to remain at that pin for periods of time which are longer than the periods of time during which the positive-going voltages must be present at pin 5 of that timer. As a result, transistor 324 will be rendered conductive earlier in each half-cycle, wherein it is to be rendered conductive, than the transistor 300 will be rendered conductive in each half-cycle wherein it is to be rendered conductive. As pointed out hereinbefore, the earlier a transistor is rendered conductive in any half-cycle, wherein it is to be rendered conductive, the greater will be the output pulse which the corresponding secondary windings will supply to welding terminals 222 and 228. This means that whenever the movable contact of potentiometer 572 is displaced from the emitter of transistor of 574, the pulses which are developed by secondary windings 144 and 160, as transistor 324 becomes non-conductive, will be larger than the pulses which are developed by secondary windings 102 and 122 as transistor 300 becomes non-conductive. The arc between the welding torch and the workpiece will tend to reduce the magnitude of the pulses, which are developed by secondary windings 144 and 160 as transistor 324 becomes non-conductive; but, even in their reduced states, the magnitudes of those pulses will tend to approach the magnitudes of the pulses which are developed by secondary windings 102 and 122 as transistor 300 becomes non-conductive. In this way, adjustment of the movable contact of potentiometer 572 enables the electric welder to attenuate the positive-going pulses in the output current waveform to the point where that waveform approaches a true A.C. waveform.

Whenever the electric welder is used as an A.C. welder, the pulses which secondary windings 102 and 122 cause diode 200 to develop at the cathode thereof will tend to cause current to flow via movable contact 248 and fixed contacts 244 and 242 of switch 234, conductor 198, secondary windings 144 and 160, diode 230, fixed contact 240, diode 251, fixed contact 246 and movable contact 250 and conductor 317 to signal ground, and thence via conductor 194 to secondary winding 102. That current can cause one of the secondary windings 144 and 160 to develop flux lines, in the magnetic core on which it is wound, which will reduce the voltage, across the control winding on that core, sufficiently to enable the control winding on the other core of the lower two magnetic amplifiers to saturate before the end of the half-cycle applied thereto—with consequent development of an output pulse by secondary windings 144 and 160 across the welding terminals. Similarly, the pulses which secondary windings 144 and 160 cause diode 230 to develop at the cathode thereof will tend to cause current to flow via stationary contact 240, diode 251, stationary contact 246 and movable contact 250, conductors 317 and 194, secondary windings 102 and 122, conductor 192, diode 200, movable contact 248 and fixed contacts 244 and 242 and conductor 198 to secondary winding 144. That current can cause one of the secondary windings 102 and 122 to develop flux lines, in the magnetic core on which it is wound, which will reduce the voltage, across the control winding on that core, sufficiently to enable the control winding on the other core of the upper two magnetic amplifiers to saturate before the end of the half-cycle applied thereto—with consequent development of an output pulse by secondary windings 102 and 122 across the welding terminals. This means that whenever the electric welder is used as an A.C. welder, the rendering of transistor 300 conductive and non-conductive does not lead to the production of just one pulse across the welding terminals; and, similarly, the rendering of transistor 324 conductive and non-conductive does not produce just one pulse across those welding terminals. Instead, it means that whenever the electric welder is used as an A.C. welder and the transistor 300 is rendered conductive and non-conductive, the pulses from secondary windings 102 and 122 can cause the two lower magnetic amplifiers to develop an output pulse across the welding terminals even if the transistor 324 was not rendered conductive. Also, it means that whenever the electric welder is used as an A.C. welder and the transistor 324 is rendered conductive and non-conductive, the pulses from secondary windings 144 and 160 can cause the two upper magnetic amplifiers to develop an output pulse across the welding terminals even if the transistor 300 was not rendered conductive. Actually, because transistor 300 will be rendered conductive as long as thumbwheel switch 378 or 380 or the programmer 384 applies a command signal, to the non-inverting input of operational amplifier 480, which calls for that transistor to be conductive, the tendency of pulses from secondary windings 144 and 160 to cause the two upper magnetic amplifiers to develop an output pulse across the welding terminals will not be significant when the electric welder is providing arcrectified A.C. Similarly, because transistor 324 will be rendered conductive as long as thumbwheel switch 378 or 380 or the programmer 384 applies a command signal, to the non-inverting input of operational amplifier 480, which calls for that transistor to be conductive, the tendency of pulses from secondary windings 102 and 122 to cause the two lower magnetic amplifiers to develop an output pulse across the welding terminals will not be significant when the electric welder is providing arc-rectified A.C.

However, whenever the operator of the electric welder wishes to have the welding pulses simulate true A.C., it is necessary to keep the pulses, which are developed by secondary windings 144 and 160, from causing the two upper magnetic amplifiers to develop large output pulses. The development of any such output pulses would keep the amplitudes of the positive-going alternations of the A.C., which are supplied to the arc, from being small enough to approach the amplitudes to which the rectifying action of that arc will necessarily reduce the negative-going pulses which are supplied to that arc. The present invention keeps the pulses, which are developed by the secondary windings 144 and 160, from causing the two upper magnetic amplifiers to develop large output pulses; and it does so by using the diode 251 to provide a voltage drop which adds to the voltage drop across the diode 230. Each of those voltage drops is approximately one and one-eighth of a volt; and the resulting two and one-quarter volt drop reduces the magnitudes of the pulses which the secondary windings 144 and 160 can cause the diode 230 to supply to the two upper magnetic amplifiers. The combined voltage drops have been found to reduce the amplitudes of the pulses, which diode 230 supplies to those two upper magnetic amplifiers, sufficiently to cause the amplitudes of the output pulses from secondary windings 102 and 122 to be small enough to approach the amplitudes of the partially-rectified negative-going pulses—when the movable contact of potentiometer 572 is set in its uppermost position. In this way, the circuit of the present invention makes it possible to operate the electric welder as an A.C. welder and yet attenuate the positive-going pulses which are supplied to the arc to such an extent that the electric welder is able to supply essentially-symmetrical A.C. current pulses.

In the preferred embodiment of electric welder, the pulses which the secondary windings 144 and 160 cause the diode 230 to supply to the secondary windings 102 and 122, of the two upper magnetic amplifiers, are large enough—even when attenuated by the voltage drops across that diode and the diode 251—to cause those magnetic amplifiers to supply positive-going pulses to the welding terminals, even when the movable contact of potentiometer 572 is set at its upper limit and transistor 300 is permitted to remain non-conductive. However, those positive going pulses are so small that they can approach the amplitudes of the partially-rectified negative-going pulses.

If desired, a still further diode could be connected in series with diodes 230 and 251. Such a further diode could permit further attenuation of the pulses which secondary windings 144 and 160 cause diode 230 and 251 to apply to the secondary windings 102 and 122.

The diode 251 is not needed when the electric welder is used as a D.C. welder; because positive-going pulses from secondary windings 102 and 122 and diode 200 will back-bias diode 230; and, similarly, positive-going pulses from secondary windings 144 and 160 and diode 230 will back-bias the diode 200. Consequently, whenever the electric welder is used as a D.C. welder, the movable contact of potentiometer 572 in FIG. 2A can be set to provide any desired level of output pulses from the secondary windings 102 and 122.

The effect which rectified A.C. has on a workpiece is visually distinguishable from the effect which simulated A.C. has on a workpiece. Consequently, when the operator of the electric welder wishes to do welding wherein simulated A.C. is desired, he should take a scrap piece of metal and use it as a workpiece. As he does so, he should adjust the knob of potentiometer 572 until he attains the desired appearance of the finished weld on that scrap piece of metal. Thereafter he can start welding on the actual workpiece and be assured that he can provide the desired weld.

Jumpers For Terminal Board

Figure 8:
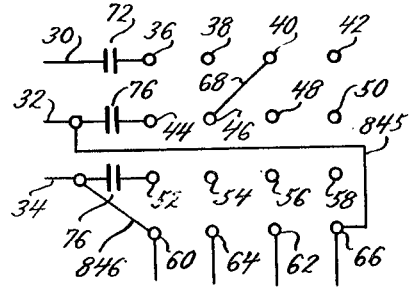
FIG. 8 is a schematic view of a terminal board which facilitates quick and essentially fool-proof connecting of the windings of the magnetic amplifiers of FIG. 1 for operation on 220 volt 60 cycle A.C. or on 440 volt 60 cycle A.C.

As shown particularly by FIG. 8, a terminal board has sixteen terminals that are arranged in four vertical rows of four terminals. Terminals 36, 44, 52 and 60 constitute one row; and the upper three of those terminals are permanently connected to contacts 72, 74 and 76, respectively, and also to terminals 90, 130 and 166, respectively. Terminal 60 is permanently connected to one end of primary winding 80. Terminals 38, 46, 54 and 64 constitute the second row; and terminals 38 and 54 are permanently connected to terminals 110 and 168, respectively. Terminal 64 is permanently connected to the other end of primary winding 80. Terminals 40, 48, 56 and 62 constitute the third row; and the upper three of those terminals are permanently connected to terminals 132, 136 and 152, respectively. Also, terminal 40 is permanently connected to terminal 46 of the second row of terminals by jumper 68. Terminal 62 is permanently connected to one end of primary winding 82. Terminals 42, 50, 58 and 66 constitute the fourth row; and terminals 50 and 58 are permanently connected to taps 115 and 117, respectively. Terminal 66 is permanently connected to the other end of primary winding 82. Whenever the electric welder provided by the present invention is to be operated on 220 volts 60 cycle A.C., the jumpers 170, 172 and 182 will be connected between the upper three terminals of the two left-hand rows of terminals; and the jumpers 180 and 174 will be connected between the two middle terminals of the two right-hand rows of terminals. Also, jumper 176 will be connected between terminals 60 and 62 to apply 220 volts across winding 82; and jumper 178 will be connected between terminals 64 and 66 to apply 220 volts across winding 80. In addition, a jumper can be connected between terminals 40 and 42—even though the terminal 42 is not used. A jumper 845 permanently connects terminal 66 to conductor 32; and a jumper 846 permanently connects terminal 60 to conductor 34.

Figure 7:
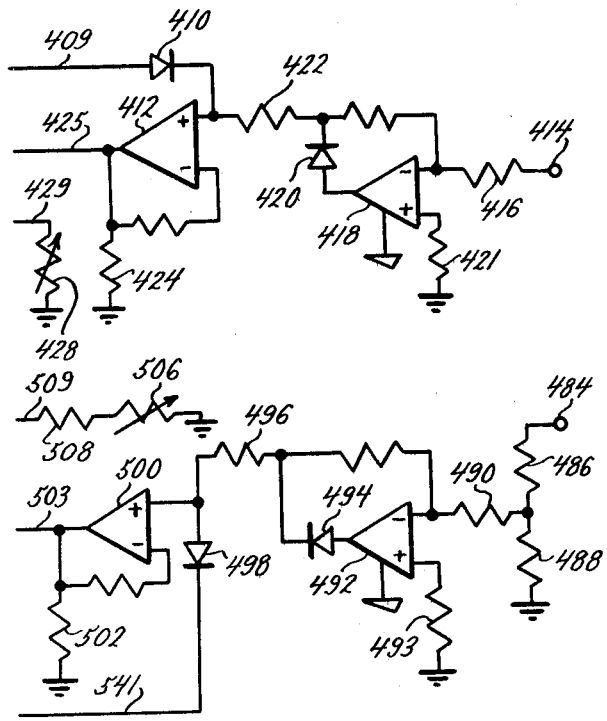
FIG. 7 is a schematic diagram showing how the electric welder of FIG. 1 can be connected for operations on 440 volt 60 cycle A.C.
Figure 7:
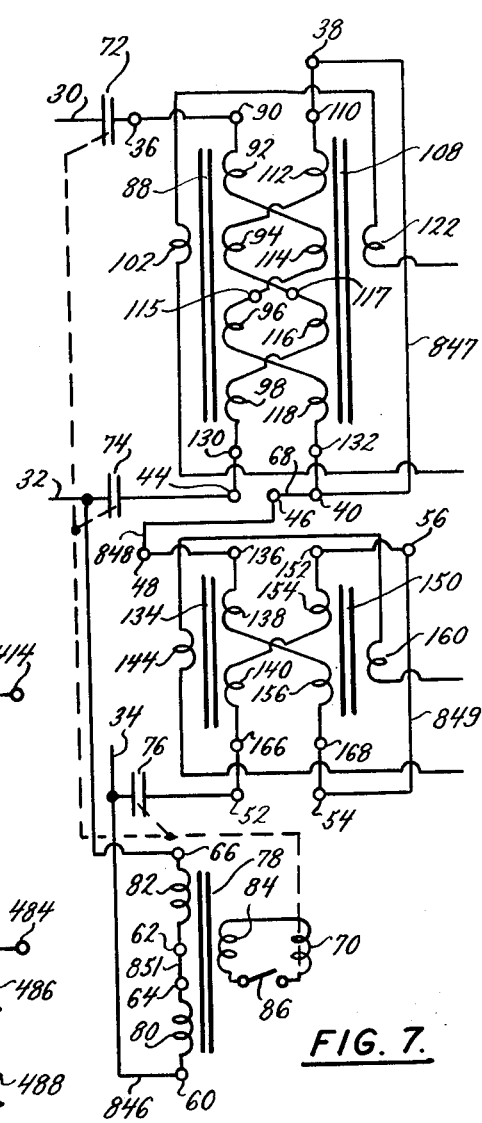

To place the electric welder in condition to be operated on 440 volts 60 cycle A.C., it is only necessary to remove the jumpers which are connected to the left-hand row of terminals, to remove the jumpers which are connected to the right-hand row of terminals, and to connect jumpers between the two center rows of terminals. Thus, as shown particularly by FIG. 7, a jumper 847 is connected between terminals 38 and 40, a jumper 848 is connected between terminals 46 and 48, and a jumper 849 is connected between terminals 54 and 56. Also, a jumper 851 is provided between terminals 62 and 64. Those jumpers cause current to flow from conductor 30 via contacts 72, terminals 36 and 90, primary windings 92, 114, 96 and 118, terminals 132 and 40, jumper 847, terminals 38 and 110, primary windings 112, 94, 116 and 98, terminals 130 and 44, and contacts 74 to conductor 32. Current also will flow from conductor 34 via contacts 76, terminals 52 and 166, primary windings 140 and 154, terminals 152 and 56, jumper 849, terminals 54 and 168, primary windings 156 and 138, terminals 136 and 48, jumper 848, terminal 46, jumper 68, terminal 40, jumper 847, terminals 38 and 110, primary windings 112, 94, 116 and 98, terminals 130 and 44, and contacts 74 to conductor 32.

The terminal board arranges the rows of terminals so the terminals in the two outer rows of terminals are jumpered for 220 volt operation, and so the inner terminals are jumpered for 440 volt operation. That arrangement makes the conversion of the electric welder from 220 volt operation to 440 volt operation and vice versa very simple. Furthermore, it makes that conversion essentially fool proof, because an inspector can immediately determine whether any improper connection has been made. Specifically, if any pair of terminals in either of the two outer rows of terminals is jumpered at a time when any pair of terminals in the inner rows of terminals is jumpered, the inspector will immediately know that a connection error has been made. Consequently, the terminal board of FIG. 8 minimizes the risk of inadvertent connections while also providing quick and simple conversion of the electric welder from 220 volt operation to 440 volt operation and vice versa.

Operation On 440 Volts

The operation of the electric welder on 440 volts will be essentially the same as the operation of that electric welder on 220 volts, except that the primary windings will be connected so 440 volts can be applied to them safely. Thus, instead of connecting primary windings 92, 114, 96 and 118 in series between conductors 30 and 32—as is done for operation on 220 volts—the primary windings 92, 114, 96, 118, 112, 94, 116 and 98 are connected in series between those terminals. Also, instead of connecting primary windings 140, 154, 116 and 98 in series between terminals 34 and 32—as id done for operation on 220 volts—primary windings 140, 154, 156, 138, 112, 94, 116 and 98 are connected in series between those terminals. Further, instead of connecting primary windings 80 and 82 in parallel across conductors 32 and 34, those windings will be connected in series across those conductors.

The voltages which will be developed across the control windings 100, 120, 142 and 158 will be the same, whether the electric welder is operated on 220 volts or 440 volts. Similarly, the voltages developed across the secondary windings 104, 106, 124, 126, 146, 148, 162 and 164 will be the same whether the electric welder is operated on 220 volts or 440 volts.

Whether the electric welder is operated on 220 volts or 440 volts, the thumbwheel switch 378 or 380 or the programmer 384 will provide the exact same control. Further, the numerals and markings adjacent the knobs of that thumbwheel switch or of that programmer will be as valid for 440 volt operation as for 220 volt operation. All of this means that the electric welder of the present invention can easily be converted from 220 volt operation to 440 volt operation, and vice versa, and thereafter operate to provide the desired welding operations at the voltages and currents selected by thumbwheel switch 378 or 380 or by the programmer 384.

Alternate Form Of Electric Welder

Figure 9:
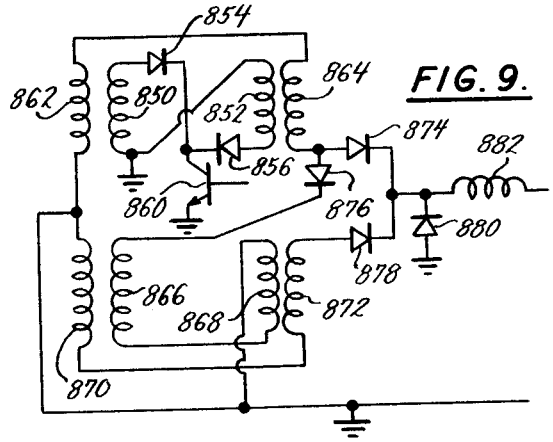
FIG. 9 is a schematic diagram of an alternate form of electric welder wherein only one selectively-conductive element is used to initiate the development of output pulses.

Referring particularly to FIG. 9, the numerals 850, 852, 866 and 868 denote control windings which preferably are identical to the control windings 100, 120, 142 and 158 of FIG. 1; and the former control windings are wound on cores, not shown, which preferably are identical to the magnetic cores 88, 108, 134 and 150. The numerals 862, 864, 870 and 872 denote secondary windings which preferably are identical to the secondary windings 102, 122, 144 and 160 of FIG. 1; and the former secondary windings are wound on the magnetic cores on which the control windings 850, 852, 866 and 868 are wound. Those magnetic cores also will have primary windings, not shown, wound thereon; and those primary windings preferably are identical to the primary windings 92, 94, 96, 98, 112, 114, 116, 118, 138, 140, 154 and 156 of FIG. 1. The numeral 860 denotes an NPN transistor which has the emitter thereof connected directly to signal ground; and a diode 854 connects the upper end of control winding 850 to the collector of that transistor, while a diode 856 connects the lower end of control winding 852 to that collector. That transistor preferably is identical to the transistor 300 in FIG. 1; and it preferably will be rendered conductive and non-conductive by circuitry which is identical to the circuitry that is used to render the transistor 300 conductive and non-conductive. The diodes 854 and 856 preferably are identical to the diodes 316 and 318 of FIG. 1.

The lower end of control winding 850 and the upper end of control winding 852 are connected directly to signal ground; and the upper end of control winding 868 is connected directly to signal ground. A diode 876 connects the lower end of secondary winding 864 to the upper end of control winding 866; and the lower end of that control winding is connected to the lower end of control winding 868 in series-opposing relation. The secondary windings 862 and 864 are connected in series-opposing relation between signal ground and the anode of diode 874—which has its cathode connected to a welding terminal 222 by a swinging choke 882. Similarly, the secondary windings 870 and 872 are connected in series-opposing relation between signal ground and the anode of diode 878—which has its cathode connected to welding terminal 222 by that swinging choke.

The diodes 874 and 876 preferably are identical to the diodes 200 and 230 of FIG. 1. Also, the swinging choke 882 preferably is identical to the swinging choke 220; and a diode 880 preferably is identical to the diode 232. The transistor 860 will have an R.C. network and diode connected across its collector-emitter circuit in the same manner in which the resistor 310, capacitor 308 and diode 312 are connected across the collector-emitter circuit of transistor 300.

It will be noted that neither of the control windings 866 and 868 is connected across a transistor, whereas each of the control windings 142 and 158 in FIG. 1 is connected across the collector-emitter circuit of transistor 324. This is made possible by using the output pulses from the secondary windings 862 and 864 to control the voltages across control windings 866 and 868.

The primary windings, for the magnetic amplifiers of which the control windings 850 and 852 are parts, will develop waveforms across those control windings which will be identical to the waveforms 740 and 742 of FIGS. 3–5. Similarly, the primary windings, for the magnetic amplifiers of which the control windings 866 and 868 are parts, will develop waveforms across those control windings which will be identical to the waveforms 740 and 742 of FIGS. 3–5 and which will be displaced ninety degrees from the waveforms across the control windings 850 and 852. If the transistor 860 is rendered conductive at the beginning of a waveform 740 which is being developed across one of the control windings 850 and 852, the subsequent saturation of the core of the other control winding will render transistor 860 non-conductive and develop a waveform 756. The secondary windings 862 and 864 will respond to the latter waveform to develop a large positive-going pulse 776,778 which will be supplied to the welding terminal 222 via diode 874 and swinging choke 882. That pulse also will be applied across series-opposing control windings 866 and 868; and it will promptly drive down to zero the voltage across whichever one of those control windings is developing a positive-going waveform across it—with consequent development of a large negative-going voltage across the other of those control windings. When that other control winding saturates the core on which it is wound, the voltage across the one control winding will rise abruptly—as indicated by the waveform 756 in FIG. 3. The resulting positive-going pulse 770,772 between the upper end of secondary winding 872 and ground will cause diode 878 to apply a positive-going pulse 776,778 to welding terminal 222. In this way, the rendering of transistor 860 conductive will immediately and directly reduce to zero the voltage across whichever one of the control windings 850 and 852 is developing a positive-going waveform 740; and the consequent saturation of the core of the other of those control windings will lead to the development of the positive pulse 776,778 by secondary windings 862 and 864. That positive pulse will then promptly reduce to zero the voltage across whichever one of the control windings 866 and 868 is developing a positive-going waveform 740—with consequent saturation of the core of the other of those control windings to effect the development of the waveform 756,760 by the one control winding and of the waveforms 770,772 and 776,778 by secondary windings 870 and 872.

The transistor 860 can be rendered conductive at different points during the waveform 740, as indicated by FIGS. 4 and 5. Pulse 804,806 or 842,844 will develop when that transistor is subsequently rendered non-conductive—as the companion control winding saturates the core on which it is wound and thereby forces the essentially-zero voltage across the one control winding to rise, as indicated by the waveforms 788 and 820 in FIGS. 4 and 5. Although the pulse 804, 806 or 842,844 is smaller in amplitude and duration than the pulse 776,778 of FIG. 3, even the pulse 842,844 will be large enough to drive down to zero the voltage across whichever one of the control windings 866 or 868 is developing a waveform 740. The subsequent pulse, which secondary windings 870 and 872 will cause diode 878 to supply to welding terminal 222, will correspond in amplitude and duration to pulse 804,806 or 842,844. As a result, when the transistor 860 is rendered conductive and non-conductive to cause secondary windings 862 and 864 to develop output pulses and cause diode 874 to apply them to welding terminal 222, that transistor also causes the secondary windings 870 and 872 of the two lower magnetic amplifiers to develop output pulses and apply them to welding terminal 222—as by causing the output pulses from secondary windings 862 and 864 to drive down the voltage across whichever one of the control windings 866 and 868 is developing a waveform 740.

The alternate form of electric welder shown by FIG. 9 is less expensive than the electric welder shown by FIGS. 1, 2A and 2B; because it does not require transistor 324, resistors 326 and 328, capacitor 330, diode 332, resistors 282 and 284, Zener diode 280, conductors 283 and 321, terminals 285, 287, 320, 322, 690 and 730, potentiometers 572 and 586, resistor 590, capacitor 594, it does not require timer 578 to have two separately-controlled sections, it does not require any of the circuitry connected to pins 3, 4 and 6 of that timer, and it does not require any of the circuitry between pin 5 of that timer and transistor 324. However, the form of electric welder in FIG. 9 cannot provide the pulse-type D.C. welding or the symmetrical A.C. welding which the form of electric welder in FIGS. 1, 2A and 2B can provide; because both of those modes of welding are dependent upon the ability of the electric welder to vary the amplitudes and durations of the output pulses from one pair of magnetic amplifiers relative to the amplitudes and durations of the output pulses from a second pair of magnetic amplifiers.

Conclusion

It will be noted that resistor 448 and terminal 444 connect the upper lead of ammeter 452 to a terminal, namely the terminal 442 in FIG. 2A, at which only D.C. signals appear, whether the electric welder is operated as a D.C. welder or an A.C. welder. Similarly it will be noted that resistor 526 and terminal 522 connect the upper lead of voltmeter 530 to a terminal, namely the terminal 520 in FIG. 2A, at which only D.C. signals appear whether the electric welder is operated as a D.C. welder or an A.C. welder. This is desirable; because it enables a single ammeter to indicate the value of welding current, and it enables a single voltmeter to indicate the value of welding voltage, whether the electric welder is used as a D.C. welder or as an A.C. welder.

It will be noted that when current flows through the secondary winding 102 in FIG. 1, the resulting flux lines in core 88 will tend to held control winding 100 saturate that core. Similarly, when current flows through any of the secondary windings 122, 144 and 160, the resulting flux lines in core 108, 134 or 150 will tend to help control winding 120, 142 or 158 saturate that core. This is desirable, because it reduces the amount of current which must be supplied to those control windings to effect the saturation of those cores.

The voltage at the output of the bridge rectifier constituted by diodes 268 and 270 and the left-hand diodes of bridge rectifier 256 will be applied to the anode of diode 290; and the voltage at the output of the bridge rectifier constituted by the diodes 286 and 288 and the left-hand diodes of bridge rectifier 278 will be applied to the anode of that diode. Whenever either of those voltages exceeds the voltage across the RC network constituted by resistor 304 and capacitor 306, that diode will be forward-biased and will apply a voltage to that RC network. Also, whenever the upper end of control winding 100 develops a positive voltage which exceeds the voltage across that RC network, diodes 316 and 314 will apply that voltage to that RC network, and whenever the lower end of control winding 120 develops a positive voltage which exceeds the voltage across that RC network, diodes 318 and 314 will apply that voltage to that RC network. Similarly, whenever the upper end of control winding 142 develops a positive voltage which exceeds the voltage across that RC network, diodes 336 and 334 will apply that voltage to that RC network; and whenever the lower end of control winding 158 develops a positive voltage which exceeds the voltage across that RC network, diodes 338 and 334 will apply that voltage to that RC network. As a result, a voltage of about fifty volts is continuously maintained across that RC network.

It will be noted that diodes 316 and 314 and the RC network are connected in parallel with the control winding 100, that diodes 318 and 314 and the RC network are connected in parallel with the control winding 120, that diodes 336 and 334 and the RC network are connected in parallel with the control winding 142, and that diodes 338 and 334 and the RC network are connected in parallel with the control winding 158. If the voltage across that RC network were ever permitted to drop close to zero, that RC network would shunt whichever of those control windings was applying a positive voltage to the anode of diode 314 or to the anode of diode 334; and any such shunting would cause the companion control winding to start saturating the core on which it was wound. The present invention keeps that RC network from shunting any of the control windings by maintaining a voltage of about fifty volts across that RC network.

The thumbwheels of thumbwheel switches 378 and 380 and the knobs of programmer 384 can be set to desired values by the operator of the electric welder. Also, some of the potentiometers can have the movable contacts thereof adjusted by that operator; but the rest of the potentiometers and all of the adjustable resistors are adjusted at the factory. In FIG. 2A, potentiometers 402, 532, 536 and 572 have knobs which can be actuated by that operator to adjust the settings of those potentiometers. However, adjustable resistors 470 and 570 of FIG. 2A, adjustable resistors 428, 506, 652 and 698 of FIG. 2B, and potentiometers 554, 558 and 586 of FIG. 2A are set at the factory.

Potentiometer 586 is set to apply to pins 12 and 13 of timer 578 the same voltages that are applied to pins 1 and 2, irrespective of variations in the values of resistance of resistors 588 and 590 or in the values of capacitance of capacitors 592 and 594. Potentiometers 554 and 558 are set to keep voltage pulses from appearing across welding terminals 222 and 228 whenever essentially-zero voltage is applied to the non-inverting input of operational amplifier 480. However, those potentiometers also must be set so the electric welder can provide maximum output when the thumbwheel switch 378 or 380 or the programmer 384 is supplying maximum voltage to the non-inverting input of that operational amplifier.

Adjustable resistor 470 and adjustable resistors 428 and 506 should be adjusted at the same time. Adjustable resistor 470 should be set to provide a resistance, between the output of operational amplifier 466 and the inverting input of operational amplifier 480, which is as small as can be set without causing either of the group of operational amplifiers 432, 436, 466 and 480 or 510, 516, 466 and 480 to start oscillating. Specifically, adjustable resistor 470 should have the effective resistance thereof progressively reduced until either of the groups of operational amplifiers begins to oscillate; and then that effective resistance should be increased slightly. Thereafter, the adjustable resistors 428 and 506 should be adjusted to help keep those groups of operational amplifiers from oscillating.

Adjustable resistor 570 is part of a voltage divider which includes resistors 566 and 568 and which applies a biasing voltage to the base of transistor 574. That adjustable resistor should be set to cause that transistor to supply a sufficiently-high voltage to pin 3 of timer 578, and to cause the movable contact of potentiometer 572 to apply an equal or higher voltage to pin 11, so those pins cannot develop positive-going voltages until the output pulses, which are developed by secondary windings 144 and 160 or by secondary windings 102 and 122, have dissipated sufficiently to make certain that the current, due to those output pulses, can not keep transistor 324 or 300 conductive. The cores 134 and 150 will respond to the output pulses developed by secondary windings 144 and 160 and the cores 88 and 108 will respond to the output pulses developed by secondary windings 102 and 122, to store electromagnetic energy; and that electromagnetic energy will tend to prolong those output pulses. By appropriate setting of adjustable resistor 570, the timer 578 can be kept from establishing positive-going voltages at pin 5 or pin 9 until the electromagnetic energy in those cores has been dissipated.

The adjustable resistor 652 coacts with capacitor 644 to constitute an RC network which will determine how long the positive-going pulses from the collector of transistor 638 will be applied to the non-inverting input of amplifier 630. Similarly, adjustable resistor 698 and capacitor 706 constitute an RC network which will determine how long the positive-going pulses from the collector of transistor 700 will be applied to the non-inverting input of amplifier 692. Those adjustable resistors should be set so those positive-going signals will remain at those non-inverting inputs long enough to make certain that the voltage waveforms 740, in the left-hand views of FIGS. 3–5, will fall to and remain at the levels of waveforms 752, 785 and 816 for time periods which are long enough to keep the appropriate transistor 300 or 324 in conduction until diodes 626 and 688 respond to the terminations of those positive-going pulses to reduce the voltages at the inverting inputs of amplifiers 630 and 692 below the levels of the voltages at the non-inverting inputs of those amplifiers. However, the adjustable resistors 652 and 698 should be set so the pulses at the non-inverting inputs of amplifiers 630 and 692 are short enough to permit the durations of the conductive periods of transistors 300 and 324 to be controlled by the saturations of the cores on which the un-shunted control windings are wound.

The operator of the electric welder should not set the movable contact 392 of FIG. 6 in engagement with fixed contact 388 unless the plug, which is used to connect the right-hand terminal of remotely-located thumbwheel switch 380 to the movable contact of thumbwheel switch 378 and to connect the movable contact of that remotely-located thumbwheel switch to fixed contact 388, is inserted in the socket therefor. However, even if that operator were to inadvertently set that movable contact in engagement with that fixed contact, at a time when that plug was not in that socket, the resistor 382 would enable the signal at the middle contact of thumbwheel switch 378 to apply a voltage to the non-inverting input of operational amplifier 480 in FIG. 2A which would enable that thumbwheel switch to control the output of the electric welder.

The electric welder provided by the present invention is a universal electric welder, because it can be used as an A.C. welder or a D.C. welder. If desired, however, that electric welder could easily be converted from a universal welder to an A.C. welder or to a D.C. welder. All that would be needed is the elimination of the double-pole double-throw switch 234 and the use of direct connections instead of that switch to interconnect the desired components.

Terminal 222 will be connected to the welding torch and terminal 228 will be connected to the workpiece whenever the operator wishes to weld on "straight polarity". However, terminal 222 will be connected to the workpiece and terminal 228 will be connected to the welding torch whenever the operator wishes to weld on "reverse polarity".

In the preferred embodiment of the present invention, each of the cores 88, 108, 134 and 150 is an ARNOLD ENGINEERING AA525 core. Specifically, each of those cores is made by tape winding a three and three-eighths inch wide oriented silicon steel tape on a rectangle which is two and one-eighth by six and one-sixteenth inches; and the thickness of each core is one and eleven thirty-seconds of an inch. The weight of the metal in each core is twenty-four and two-tenths pounds.

Each of the secondary windings 102, 122, 144 and 160 has thirty-four turns of number two square wire. Each of the primary windings 92, 114, 96 and 118, and each of the primary windings 112, 94, 116 and 98, has fifty turns of number eight square wire. Each of the primary windings 138 and 156, and each of the primary windings 154 and 140, has eighty-seven turns of number nine square wire. Each of the control windings 100, 120, 142 and 158 has forty-three turns of number fourteen round wire. Each of the windings 104, 124, 146 and 162 has twenty-two turns of number twelve round wire. Each of the windings 106 and 126 has seven turns of number eighteen round wire. Each of the windings 148 and 150 has fifty turns of number twelve round wire. If desired, of course, the four magnetic amplifiers could be made with many different sizes and kinds of cores and windings.

The other components of the electric welder are standard and usual components. Various sizes and values of components can be used; but the attached list specifies the sizes and values of components which are used in the preferred form of electric welder.

Whereas the drawing and accompanying description have shown and described two preferred embodiments of the present invention, it should be apparent to those skilled in the art that various changes may be made in the form of the invention without affecting the scope thereof.

Components

78—Step down transformer
200—diode—200 amp
216—resistor—3 ohm
230—diode—200 amp
232—diode—200 amp
251—diode—200 amp
254—resistor—2 ohm 500 W 256—IN4001 bridge rectifier
258—8 V Zener diode
260—resistor—10K
262—resistor—100K
268—diode—10 amp
270—diode—10 amp
280—8 V Zener diode
282—resistor—10K
284—resistor—100K
286—10 amp diode
288—10 amp diode
300—MJI10000 transistor
302—resistor—22 ohm
304—resistor—50 ohm 100 W
306—1000 microfarad 150 V capacitor
308—1 microfarad capacitor
310—resistor—10 ohm
312—diode—6 amp
314—diode—6 amp
316—diode—6 amp
318—diode—6 amp
320—terminal—1000 microfarad 150 V
324—NPN Transistor MJI10000
326—resistor—22 ohm
328—resistor—10 ohm
330—capacitor—1 microfarad
332—diode—6 amp
334—diode—6 amp
336—diode—6 amp
338—diode—6 amp
360—Bridge rectifier—6 amp 25 V
362—capacitor—1000 microfarad 25 V
366—diode IR3051
378—T11F-O2-A3 thumbwheel switch of Cherry Electronics
380—T11F-O2-A3 thumbwheel switch of Cherry Electronics
382—resistor—22K
400—resistor—6.8K
402—1K POT
404—resistor—10K
406—One-quarter of LM-2902 amp package of National Semi Conductor
408—resistor—1K
410—IN4001 diode
412—One-quarter of LM-2902 amp package of National Semi Conductor
416—resistor—10K 1%
418—amplifier (same as 406)
420—IN4001 diode
421—resistor—10K
422—resistor—10K
424—resistor—1K
426—resistor—100K
426—100K POT
430—resistor—22K
432—amplifier (same as 406)
433—resistor—100K
435—capacitor—0.1 microfarad
436—amplifier (same as 406)
438—IN4001 diode
440—resistor—1K
448—resistor—current limiting
450—capacitor—0.068 microfarad
464—resistor—10K
466—amplifier (same as 406)
468—resistor—1K
470—1K POT
472—resistor—2.2K
480—amplifier (same as 406)
482—resistor—10K
486—resistor—200K 1%
488—resistor—10K 1%
490—resistor—1% 470 ohm
492—amplifier (same as 406)
493—resistor—10K
494—diode IN4001
496—resistor—10K
498—diode IN4001
500—amplifier (same as 406)
502—resistor—1K
504—resistor—100K
506—100K POT
508—resistor—22K
510—amplifier (same as 406)
512—capacitor—0.1 microfarad
514—resistor—100K
515—diode IN4001
516—amplifier (same as 406)
518—resistor—1K
526—resistor—current limiting
528—capacitor—0.068 microfarad
532—100K POT
534—resistor—6.8K
536—1K POT
538—resistor—10K
540—amplifier (same as 406)
542—resistor—1K
544—resistor—4.7K
546—resistor—10K
548—resistor—10K
550—resistor—4.7K
552—resistor—470 ohm
554—1K POT
555—capacitor—0.05 microfarad
556—resistor—10K
558—10K POT
560—resistor—2.2K
562—PNP transistor 2N2907
564—capacitor—0.05 microfarad
566—resistor—1K
568—resistor—3.3K
570—25K POT
572—25K POT
574—PNP transistor 2N2907
576—capacitor—0.1 microfarad
578—LMN556 timer by National Semi Conductor
582—capacitor—0.001 microfarad
586—1M POT
588—resistor—470K
590—resistor—470K
592—capacitor—0.01 microfarad
594—capacitor—0.01 microfarad
600—NPN transistor 2N2222
604—capacitor—500 micro-microfarad
606—resistor—47K
608—capacitor—0.001 microfarad
610—resistor—1K
612—resistor—10K
614—resistor—2.2K
616—amplifier (same as 406)
618—diode—IN4001
620—resistor—2.2K
622—diode—IN4001
624—resistor—1K
626—diode—IN4001

630—amplifier (same as 406)
632—diode—IN4001
634—capacitor—0.1 microfarad
636—resistor—22K
638—NPN transistor 2N2222
640—resistor—2.2K
642—diode—IN4001
644—capacitor—100 micro-microfarad
646—diode—IN4001
648—resistor—3.3K
650—resistor—1K
652—100K POT
654—NPN transistor—2N2222
656—resistor—50 ohm 2 W
658—NPN transistor MJE180
660—resistor—15 ohm 2 W
662—diode—IN4001
666—NPN transistor 2N2222
667—capacitor—500 micro-microfarad
668—resistor—1K
670—resistor—47K
672—capacitor—0.001 microfarad
674—amplifier 9same as 406)
676—resistor—10K
678—resistor—2.2K
680—diode IN4001
682—resistor—2.2K
684—diode IN4001
686—resistor—1K
688—diode—IN4001
692—amplifier (same as 406)
694—resistor—33K
696—resistor—1K
698—100K POT
700—NPN transistor 2N2222
702—resistor—2.2K
704—diode IN4001
706—capacitor—100 micro-microfarad
708—diode—IN4001
710—resistor—22K
712—capacitor—0.1 microfarad
714—diode—IN4001
720—NPN transistor 2N2222
722—resistor—50 ohm 2 W
724—NPN transistor MJE180
726—resistor—15 ohm 15 W
728—diode IN4001

What I claim is:

1. A phase-converting, variable-output, power source which converts A.C. of a given frequency into variable-amplitude A.C. having a different frequency and which comprises two magnetic amplifiers that are connected as part of one leg of a Scott connection, two further magnetic amplifiers that are connected as part of a further leg of said Scott connection, the first said two magnetic amplifiers having the primary windings thereof connected in series-aiding relation and having the secondary windings thereof connected in series-opposing relation to produce substantially no output voltage until at least one of the magnetic cores of said first two or of said two further magnetic amplifiers becomes saturated, said two further magnetic amplifiers having the primary windings thereof connected in series-aiding relation and having the secondary windings thereof connected in series-opposing relation to produce substantially no output voltage until at least one of the magnetic cores of said first two or of said two further magnetic amplifiers becomes saturated, a power rectifier connected in series relation with said secondary windings of said first two magnetic amplifiers to provide unidirectional current flow through said secondary windings, a second power rectifier connected in series relation with said secondary windings of said two further magnetic amplifiers to provide unidirectional current flow through said secondary windings, and control windings on said magnetic cores of said first two and of said two further magnetic amplifiers, said control windings being wound to provide magnetomotive forces which are in the same directions as magnetomotive forces developed in said magnetic cores of said first two and of said two further magnetic amplifiers by the unidirectional flow of current through said secondary windings of said first two and of said two further magnetic amplifiers, said magnetic cores being dimensioned to enable one of said magnetic cores of said first two magnetic amplifiers to become saturated during each cycle of said A.C. of said given frequency, said one of said magnetic cores being adapted to respond to saturation thereof to sharply reduce the output of the secondary winding thereon during predetermined half-cycles of said A.C. of said given frequency, the other magnetic amplifier of said first two magnetic amplifiers responding to said saturation of said one magnetic core during said predetermined half-cycle of said A.C. of said given frequency to sharply increase the output of the secondary winding on the magnetic core of the other magnetic amplifier of said first two magnetic amplifiers during said predetermined half-cycles of said A.C. of said given frequency.

2. A phase-converting, variable-output, power source as claimed in claim 1 wherein said one magnetic core and the primary winding thereon are dimensioned to absorb about one-half of the A.C. voltage in a half-cycle of said A.C. of said given frequency without saturating said one magnetic core, and wherein the magnetic core of said other magnetic amplifier and the primary winding thereon are dimensioned to absorb about one-half of the A.C. voltage in a half-cycle of said A.C. of said given frequency without saturating said magnetic core of said other magnetic amplifier.

3. A phase-converting, variable-output, power source as claimed in claim 1 wherein, said one magnetic core and the primary winding thereon are dimensioned to absorb about one-half of the A.C. voltage in a half-cycle of said A.C. of said given frequency without saturating said one magnetic core, wherein the magnetic core of said other magnetic amplifier and the primary winding thereon are dimensioned to absorb about one-half of the A.C. voltage in a half-cycle of said A.C. of said given frequency without saturating said magnetic core of said other magnetic amplifier, wherein the voltage scross a first of said secondary windings increases as the magnetic core on which a second of said secondary windings is wound saturates, and wherein the voltage across said second of said secondary windings increases as the magnetic core on which said first of said secondary windings is wound saturates.

4. A phase-convering, variable-output, power source as claimed in claim 1 wherein said one magnetic core and the primary winding thereon are dimensioned to absorb about one-half of the A.C. voltage in a half-cycle of said A.C. of said given frequency without saturating said one magnetic core, wherein the magnetic core of said other magnetic amplifier and the primary winding thereon are dimensioned to absorb about one-half of the A.C. voltage in a half-cycle of said A.C. of said given frequency without saturating said magnetic core of said other magnetic amplifier, wherein the secondary winding of one of said magnetic amplifiers of said first said two magnetic amplifiers develops an output waveform, wherein the secondary winding of the other of said magnetic amplifiers of said first said two magnetic amplifiers develops an output waveform which is substantially in register with but has a polarity opposite to that of the first said output waveform, wherein said output waveforms are additive, and wherein the saturation of said one magnetic core causes a sharp increase in the voltage across said secondary winding of said other magnetic amplifiers of said first said two magnetic amplifiers.

5. A phase-converting, variable-output, power source as claimed in claim 1 wherein the secondary winding of one of said first said two magnetic amplifiers develops an output waveform, wherein the secondary winding of the other of said first said two magnetic amplifiers develops an output waveform which is substantially in register with but has a polarity opposite to that of the first said output waveform, wherein said output waveforms are additive, wherein the saturation of the magnetic core of said one of said first said two magnetic amplifiers is wound causes a sharp increase in the voltage across said secondary winding of said other said first said two magnetic amplifiers, wherein control means control the current in said control windings of said first said two magnetic amplifiers, and wherein said control windings of said first said two magnetic amplifiers can respond to said control means to vary the points within half-cycles of said A.C. of said given frequency when said magnetic cores of said first said two magnetic amplifiers become saturated.

6. A phase-converting, variable-output, power source as claimed in claim 1 wherein the secondary winding of one of said first said two magnetic amplifiers develops an output waveform, wherein the secondary winding of the other of said first said two magnetic amplifiers develops an output waveform which is substantially in register with but has a polarity opposite to that of the first said output waveform, wherein said output waveforms are additive, wherein the saturation of the magnetic core of said one of said first said two magnetic amplifiers is wound causes a sharp increase in the voltage across said secondary winding of said other of said first said two magnetic amplifiers, wherein shunting means across one of said secondary windings of said first said two magnetic amplifiers can vary the voltage across said one secondary winding and thereby cause the voltage across said secondary winding of the other of said first said two magnetic amplifiers to change to vary the point within half-cycles of said A.C. of said given frequency when the magnetic core said other of said first said two magnetic amplifiers becomes saturated.

7. A phase-converting, variable-output, power source as claimed in claim 1 wherein a network tends to keep the voltage across one of the secondary windings of said first said two magnetic amplifiers high enough to prevent premature increases in the voltage across the other secondary winding of said first said two magnetic amplifiers.

8. A phase-converting, variable-output, power source as claimed in claim 1 wherein a selectively-conductive element can be selectively rendered conductive to cause the secondary winding on said one magnetic core to initiate the saturation of said one magnetic core, and wherein said selectively-conductive element will automatically be rendered non-conductive to enable said secondary winding on said one magnetic core to permit said one magnetic core to become unsaturated.

9. A phase-converting, variable-output, power source as claimed in claim 1 wherein rectifying means connected to said secondary windings of said first said two magnetic amplifiers makes the output of said secondary windings D.C. pulses.

10. A phase-converting, variable-output, power source as claimed in claim 1 wherein rectifying means connected to said secondary windings of said first said two magnetic amplifiers makes the output of said secondary windings D.C. pulses, and wherein control means connected to said control windings of said magnetic amplifiers of said first said two magnetic amplifiers can adjust the magnitudes of said D.C. pulses to adjust the output level of said phase-converting, variable-output, power source.

11. A phase-converting, variable-output, power source as claimed in claim 1 which is connectable to welding terminals to enable said welding terminals to develop and maintain a welding arc wherein rectifying means makes the output of said secondary windings D.C. pulses, and wherein a keep-alive circuit that is connected to said secondary windings of said first said two magnetic amplifiers supplies a low level D.C. output during intervals between said D.C. pulses to keep the welding arc from becoming extinguished between said D.C. pulses.

12. A phase-converting, variable-output, power source as claimed in claim 1 which is connectable to welding terminals to supply welding current wherein said first two magnetic amplifiers are connectable to said welding terminals to provide welding pulses of a given polarity, wherein said two further magnetic amplifiers are connectable to said welding terminals to provide welding pulses of the opposite polarity, and wherein control means connectable to said first two magnetic amplifiers is adjustable to make said welding pulses of different amplitudes and thereby provide asymmetrical welding pulses to said welding terminals.

13. A phase-converting, variable-output, power source as claimed in claim 1 wherein a control means responds to a short-circuit-initiating signal to short-circuit a control winding of one of said magnetic amplifiers of said first two magnetic amplifiers to cause all the voltage of said A.C. of said given frequency to appear across the secondary winding of the other magnetic amplifier of said first two magnetic amplifiers, wherein the resulting saturation of said magnetic core of said other of said first two magnetic amplifiers develops a timing signal, and wherein said control means responds to said timing signal to remove said short-circuit-initating signal from said selectively-conductive means.

14. A phase-converting, variable-output, power source as claimed in claim 1 wherein a control means responds to a short-circuit-initating signal to short-circuit a control winding of one of said magnetic amplifiers of said first two magnetic amplifiers to cause all the voltage of said A.C. of said given frequency to appear across the secondary winding of the other magnetic amplifier of said first two magnetic amplifiers, wherein the resulting saturation of said magnetic core of said other of said first two magnetic amplifiers develops a timing signal, and wherein said control means responds to said timing signal to remove said short-circuit-initiating signal from said selectively-conductive means, wherein said control means is adapted to supply said short-circuit-initiating signal to said control winding of said one magnetic amplifier of said first two magnetic amplifiers at a variable measured time interval of less than one-half cycle of said A.C. of said given frequency following the crossover of the A.C. voltage whether said A.C. passes from negative to positive or from positive to negative, and wherein the duration of said variable measured time interval controls the value of the output from said first two magnetic amplifiers during the ensuing cycle of the A.C. of said given frequency applied to said two magnetic amplifiers.

15. A phase-converting, variable-output, power source which which converts A.C. of a given frequency into variable-amplitude A.C. having a different frequency and which comprises two magnetic amplifiers that are connected as part of one leg of a Scott connection, two further magnetic amplifiers that are connected as part of a further leg of said Scott connection, the first said two magnetic amplifiers having the primary windings thereof connected in series-aiding relation and having the secondary windings thereof connected in series-opposing relation to produce substantially no output voltage until at least one of the magnetic cores of said first two or of said two further magnetic amplifiers becomes saturated, said two further magnetic amplifiers having the primary windings thereof connected in series-aiding relation and having the secondary windings thereof connected in series-opposing relation to produce substantially no output voltage until at least one of the magnetic cores of said first two or of said two further magnetic amplifiers becomes saturated, a power rectifier connected in series relation with said secondary windings of said first two magnetic amplifiers to provide unidirectional current flow through said secondary windings, a second power rectifier connected in series relation with said secondary windings of said two further magnetic amplifiers to provide unidirectional current flow through said secondary windings, and control windings on said magnetic cores of said first two and of said two further magnetic amplifiers, said control windings being wound to provide magnetomotive forces which are in the same directions as magnetomotive forces developed in said magnetic cores of said first two and of said two further magnetic amplifiers by the unidirectional flow of current through said secondary windings of said first two and of said two further magnetic amplifiers, one of said magnetic cores of said first said two magnetic amplifiers being adapted to respond to saturation thereof to sharply reduce the output of the secondary winding thereon during predetermined half-cycles of said A.C. of said given frequency, the magnetic core of the other of said first said two magnetic amplifiers and windings thereon responding to said saturation of said one magnetic core during said predetermined half-cycle of said A.C. of said given frequency to sharply increase the output of the secondary winding on said magnetic core of said other of said first said two magnetic amplifiers during said predetermined half-cycles of said A.C. of said given frequency, a current feedback circuit which can enable one of the control windings of said first said two magnetic amplifiers to vary the time of saturation of the magnetic core on which it is wound to enable said first said two magnetic amplifiers to supply a substantially-constant current, a voltage feedback circuit which can enable said one control winding to vary the time of saturation of said magnetic core on which it is wound to enable said first said two magnetic amplifiers to supply a substantially-constant voltage, a slope-establishing circuit which can enable said control winding to vary the time of saturation of said magnetic core on which it is wound to enable said first said two magnetic amplifiers to supply a desired slope, and an A.C.-D.C. switch that can enable said phase-converting, variable-output, power source to provide substantially-constant A.C. or D.C. voltage or to provide substantially-constant A.C. or D.C. current or to provide a desired slope for A.C. or D.C.

16. A phase-converting, variable-output, power source as claimed in claim 15 which is connectable to welding terminals wherein said current feedback circuit has a sub-circuit which is adapted to determine the initial current level during TIG welding operations, and wherein said voltage feedback circuit has a sub-circuit which is adapted to determine the initial voltage level during MIG welding operations.

17. A phase-converting, variable-output, power source as claimed in claim 15 which is connectable to welding terminals wherein said current feedback circuit automatically provides single-polarity current feedback signals whether said phase-converting, variable-output, power source is being operated as an A.C. or D.C. welder, and wherein said voltage feedback circuit automatically provides single-polarity voltage feedback signals whether said phase-converting, variable-output, power source is being operated as an A.C. or D.C. welder.

18. A phase-converting, variable-output, power source as claimed in claim 15 which is connectable to welding terminals wherein said current feedback circuit automatically provides single-polarity current feedback signals whether said phase-converting, variable-output, power source is being operated as an A.C. or D.C. welder, wherein said voltage feedback circuit automatically provides single-polarity voltage feedback signals whether said phase-converting, variable-output, power source is being operated as an A.C. or D.C. welder, wherein a D.C. ammeter is connected to said current feedback circuit to indicate welding current supplied by said phase-converting, variable-output, power source whether said phase-converting, variable-output, power source is being operated as an A.C. or D.C. welder, and wherein a D.C. voltmeter is connected to said voltage feedback circuit to indicate welding voltage developed by said phase-converting, variable-output, power source whether said phase-converting, variable-output, power source is being operated as an A.C. or D.C. welder.

19. A phase-converting, variable-output, power source which is connectable to welding terminals and which converts A.C. of a given frequency into variable-amplitude A.C. having a different frequency and which comprises two magnetic amplifiers that are connected as part of one leg of a Scott connection, two further magnetic amplifiers that are connected as part of a further leg of said Scott connection, the first said two magnetic amplifiers having the primary windings thereof connected in series-aiding relation and having the secondary windings thereof connected in series-opposing relation to produce substantially no output voltage until at least one of the magnetic cores of said first two or of said two further magnetic amplifiers becomes saturated, said two further magnetic amplifiers having the primary windings thereof connected in series-aiding relating and having the secondary windings thereof connected in series-opposing relation to produce substantially no output voltage until at least one of the magnetic cores of said first two or of said two further magnetic amplifiers becomes saturated, a power rectifier connected in series relation with said secondary windings of said first two magnetic amplifiers to provide unidirectional current flow through said secondary windings, a second power rectifier connected in series relation with said secondary windings of said two further magnetic amplifiers to provide unidirectional current flow through said secondary windings, and control windings on said magnetic cores of said first two and of said two further magnetic amplifiers, said control windings being wound to provide magnetomotive forces which are in the same directions as magnetomotive forces developed in said magnetic cores of said first two and of said two further magnetic amplifiers by the unidirectional flow of current through said secondary windings of said first two and of said two further magnetic amplifiers, said first said two magnetic amplifiers developing time-spaced welding pulses, said two further magnetic amplifiers developing further time-spaced welding pulses, and circuit means interposing said further time-spaced welding pulses between the first said time-spaced welding pulses.

20. A phase-converting, variable-output, power source as claimed in claim 19 wherein said first two magnetic amplifiers are connectable to said welding terminals to provide welding pulses of predetermined average magnitude, and wherein said two further magnetic amplifiers are connectable to said welding terminals to provide welding pulses of much smaller average magnitude, whereby said phase-converting, variable-output, power source can supply pulses for pulse-type welding.

* * * * *